US012158555B2

(12) United States Patent
Sankaranarayanan et al.

(10) Patent No.: US 12,158,555 B2
(45) Date of Patent: Dec. 3, 2024

(54) DYNAMIC FIELD OPERATIONS SYSTEM

(71) Applicant: Schlumberger Technology Corporation, Sugar Land, TX (US)

(72) Inventors: Sai Venkatakrishnan Sankaranarayanan, Katy, TX (US); Oney Erge, Houston, TX (US); Sylvain Chambon, Katy, TX (US); Richard Meehan, Houston, TX (US); Mohammad Khairi Hamzah, Katy, TX (US); Darine Mansour, Katy, TX (US); David Conn, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 43 days.

(21) Appl. No.: 17/250,701

(22) PCT Filed: Aug. 21, 2018

(86) PCT No.: PCT/US2018/047132
§ 371 (c)(1),
(2) Date: Feb. 19, 2021

(87) PCT Pub. No.: WO2020/040732
PCT Pub. Date: Feb. 27, 2020

(65) Prior Publication Data
US 2021/0302612 A1 Sep. 30, 2021

(51) Int. Cl.
*G01V 1/36* (2006.01)
*E21B 41/00* (2006.01)
(Continued)

(52) U.S. Cl.
CPC ............... *G01V 1/36* (2013.01); *E21B 41/00* (2013.01); *G01V 1/34* (2013.01); *G01V 1/50* (2013.01);
(Continued)

(58) Field of Classification Search
None
See application file for complete search history.

(56) References Cited

U.S. PATENT DOCUMENTS 7,849,934 B2 * 12/2010 Pastusek ............... E21B 47/017
175/45
9,818,136 B1 * 11/2017 Hoffberg ................. G07F 17/32
(Continued)

FOREIGN PATENT DOCUMENTS

WO WO-2016112061 A1 * 7/2016 ......... E21B 41/0092
WO WO-2016172038 A1 * 10/2016 ............. E21B 41/00

OTHER PUBLICATIONS

Cassisi, Carmelo; Prestifilippo, Michele; Cannata, Andrea; Montalto, Placido; Patane, Domenico; and Privitera, Eugenio—"Probabilistic Reasoning Over Seismic Time Series: Volcano Monitoring by Hidden Markov Models at Mt. Etna"; Pure Appl. Geophys . 173 (2016), 2365-2386. (Year: 2016).*
(Continued)

*Primary Examiner* — Kyle R Quigley
*Assistant Examiner* — Leonard S Liang
(74) *Attorney, Agent, or Firm* — Michael West

(57) ABSTRACT

A method can include acquiring data associated with a field operation in a geologic environment; processing the data by partitioning operationally and representing symbolically; formulating a symbolic query for an operating procedure specification; performing a search of the symbolically represented data utilizing the symbolic query and a probabilistic chain model; receiving a search result responsive to the search; assessing compliance with the operation procedure specification utilizing the search result; and issuing a control signal to field equipment utilizing the assessment of compliance.

19 Claims, 25 Drawing Sheets

(51) Int. Cl.
*G01V 1/34* (2006.01)
*G01V 1/50* (2006.01)
*G06N 7/01* (2023.01)

(52) U.S. Cl.
CPC .......... *G06N 7/01* (2023.01); *G01V 2200/16* (2013.01); *G01V 2210/74* (2013.01)

(56) References Cited

U.S. PATENT DOCUMENTS

| | | | |
|---|---|---|---|
| 2007/0087756 A1* | 4/2007 | Hoffberg | G06Q 20/065 455/450 |
| 2009/0070042 A1 | 3/2009 | Birchwood et al. | |
| 2013/0226562 A1 | 8/2013 | Arnon | |
| 2014/0278112 A1* | 9/2014 | Nelson | E21B 41/00 702/6 |
| 2017/0255192 A1* | 9/2017 | Thwaites | E21B 44/00 |
| 2018/0047117 A1 | 2/2018 | Meehan et al. | |
| 2018/0156022 A1 | 6/2018 | Miller | |
| 2019/0179294 A1* | 6/2019 | Layden | G05B 23/0286 |
| 2019/0317803 A1* | 10/2019 | Maheshwari | G06N 20/00 |
| 2022/0172221 A1* | 6/2022 | Bhattiprolu | H04L 9/3239 |

OTHER PUBLICATIONS

Montero et al NPL (Montero, Pablo and Vilar Jose A.—TSclust: An R Package for Time Series Clustering; Journal of Statistical Software; Nov. 2014, vol. 62, Issue 1.; http:www.jstatsoft.org/) (Year: 2014).*

* cited by examiner

Equation 1910

$$\overline{c_i} = \frac{w}{n} \sum_{j=\frac{n}{w}(i-1)+1}^{\frac{n}{w}i} c_j$$

Table 1930

| $\beta^i$ \ $a$ | 3 | 4 | 5 |
|---|---|---|---|
| $\beta_1$ | -0.43 | -0.67 | -0.84 |
| $\beta_2$ | 0.43 | 0 | -0.25 |
| $\beta_3$ | | 0.67 | 0.25 |
| $\beta_4$ | | | 0.84 |

Plot 1950

Representation 1970 cbccbaab

Hidden Markov Model 1990

System 2100

Field Equipment Interface
2110

Symbolic Representation Scheme Processor
2120

Hidden Markov Model Processor
2130

Algorithmic Processor
2140

Operating Procedure Specifications Database
2150

Graphical User Interface Processor
2160

Fig. 21

DYNAMIC FIELD OPERATIONS SYSTEM

BACKGROUND

Field operations can be performed with respect to a geologic environment. Such operations can include exploration, development, production, etc., with respect to a reservoir in the geologic environment. As an example, an operation can be a drilling operation where a bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include acquiring data associated with a field operation in a geologic environment; processing the data by partitioning operationally and representing symbolically; formulating a symbolic query for an operating procedure specification; performing a search of the symbolically represented data utilizing the symbolic query and a probabilistic chain model; receiving a search result responsive to the search; assessing compliance with the operation procedure specification utilizing the search result; and issuing a control signal to field equipment utilizing the assessment of compliance. A system can include one or more processors; a network interface operatively coupled to the one or more processors; memory operatively coupled to the one or more processors; and processor-executable instructions stored in the memory and executable by at least one of the processors to instruct the system to: acquire data associated with a field operation in a geologic environment; process the data by partitioning operationally and representing symbolically; formulate a symbolic query for an operating procedure specification; perform a search of the symbolically represented data utilizing the symbolic query and a probabilistic chain model; receive a search result responsive to the search; assess compliance with the operation procedure specification utilizing the search result; and issue a control signal to field equipment utilizing the assessment of compliance. One or more computer-readable storage media can include computer-executable instructions executable to instruct a computing system to: acquire data associated with a field operation in a geologic environment; process the data by partitioning operationally and representing symbolically; formulate a symbolic query for an operating procedure specification; perform a search of the symbolically represented data utilizing the symbolic query and a probabilistic chain model; receive a search result responsive to the search; assess compliance with the operation procedure specification utilizing the search result; and issue a control signal to field equipment utilizing the assessment of compliance. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 21 illustrates an example of a system.

DETAILED DESCRIPTION

Figure 1:
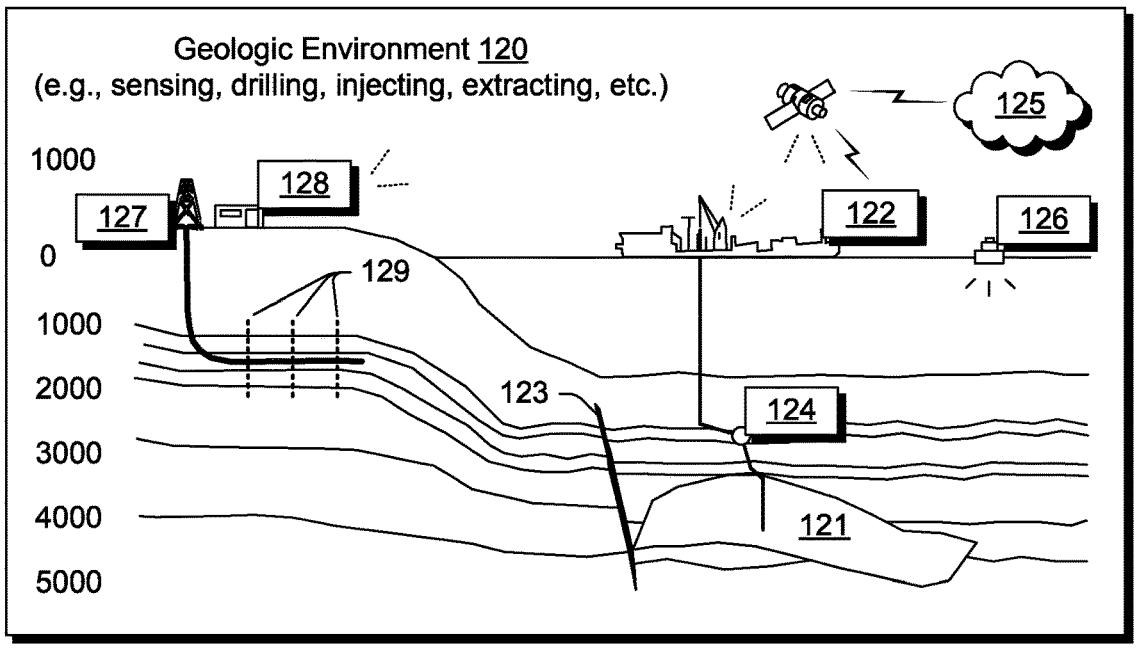
FIG. 1 illustrates examples of equipment in a geologic environment.
Figure 1:
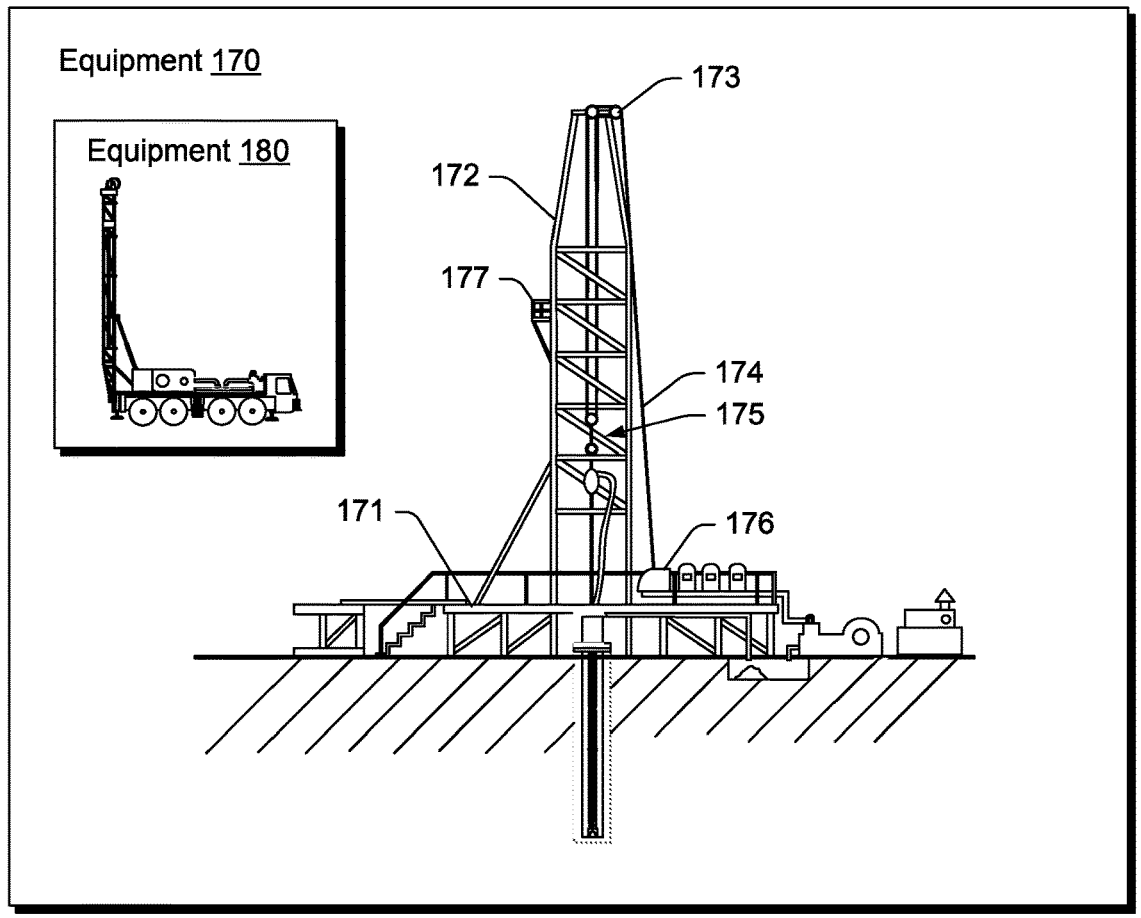

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Well planning is a process by which a path of a well can be mapped, so as to reach a reservoir, for example, to produce fluids therefrom. As an example, constraints can be imposed on a design of a well, for example, a well trajectory may be constrained via one or more physical phenomena that may impact viability of a bore, ease of drilling, etc. Thus, for example, one or more constraints may be imposed based at least in part on known geology of a subterranean domain or, for example, presence of other wells in the area (e.g., collision avoidance). As an example, one or more other constraints may be imposed, for example, consider one or more constraints germane to capabilities of tools being used and/or one or more constraints related to drilling time and risk tolerance.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

As an example, one or more operating procedure specifications (e.g., standard operating procedures (SOPs) or other specified operation procedures) can define what operations are to occur and, for example, how those operations are to occur. An operation can include, for example, physically moving a drillstring in a bore, which may be to further drill the bore (e.g., borehole), to trip out the drillstring, to trip in the drillstring, etc. Moving a drillstring in a bore can include rotating one or more components of the drillstring (e.g., consider rotating a drill bit) and/or translating the drillstring. In various examples, one or more sensors can measure weight of a drillstring, which may be a weight on bit (WOB) measurement. In various examples, one or more sensors can measure rotation of a drillstring or component thereof. In various examples, one or more of torque, vibration, fluid flow, pressure, temperature, etc., may be measured by one or more corresponding sensors, directly and/or indirectly, additionally or alternatively to one or more other measurements. In various examples, measurements can be acquired and utilized to determine one or more of actions and conditions, as may be specified in one or more operating procedure specifications, which may be or include one or more standard operation procedures (SOPs).

As an example, states such as rigstates may be utilized in planning, implementation, diagnostics, automation, etc. For example, state information may be acquired and stored and/or analyzed. In such an example, analysis of state information may allow for making determinations as to whether a plan is being adequately followed, equipment is operating as expected, etc.

As an example, data may be represented by symbols. As an example, consider characters as symbols, which may be or include text characters. For example, alphanumeric characters may be utilized to represent a plurality of different states. In such an example, a search engine may be an alphanumeric search engine that can perform searches of stored information (e.g., indexed information, etc.) using queries, which may be alphanumeric representations of length one or more. In such an example, wildcards, etc. may be utilized, as may be features of an alphanumeric search engine. As an example, a chain model may be implemented such as a probabilistic chain model (e.g., consider a hidden Markov model) as part of a search engine that can perform searching in an effort to match symbolically represented data (e.g., partitioned data as sequences) to a query, which can be symbolically represented as a sequence of operations, etc.

As an example, partitioning data can be performed by operationally partitioning, which can include partitioning the data by a portion of an operation, an operation or a combination of operations. For example, a drilling related operation may be represented as a single letter or a sequence of letters where a letter can be associated with one or more features discernable in data, which can be time series data from one or more channels (e.g., data channels available at a rigsite, etc.).

As an example, individual field operations may be represented by one or more corresponding letters. As an example, uppercase and lowercase letters may be utilized. As an example, one or more other characteristics may be utilized to distinguish one letter from another letter. As an example, ASCII codes may be utilized and/or characters associated with or defined by ASCII codes. For example, consider codes 20 hex to 7 Ehex, known as the printable characters, represent letters, digits, punctuation marks, and a few miscellaneous symbols (noting that ASCII can include 95 printable characters).

As an example, consider a symbolic representation scheme that include letters such as, for example, 26 letters that may optionally be further classified as upper case or lower case. For example, consider the modern English alphabet, which is a Latin alphabet of 26 letters (each having an uppercase and a lowercase form). Such letters are found in the ISO basic Latin alphabet (e.g., consider upper case letters: A B C D E F G H I J K L M N O P Q R S T U V W X Y Z).

As an example, a system may implement one or more Symbolic Aggregate approXimation (SAX) representations. For example, SAX can be utilized to represent information that may be in a time series. As an example, a SAX approach may be utilized in a depth series, a length of trajectory series and/or a time series. For example, a field operation may correspond to a depth into the earth from a surface or other reference location (e.g., a depth series), a length along a trajectory of a piece of equipment (e.g., a trajectory dimension or length series) and/or a time during performance of various field operations (e.g., a time series).

Various examples of types of environments, various examples of types of equipment and various examples of types of methods, operations, etc. are described below. Various examples of state systems, state system methods, etc. are also described, which may be utilized in one or more of the environments, for one or more types of equipment, for one or more types of methods, operations, etc.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

Figure 2:
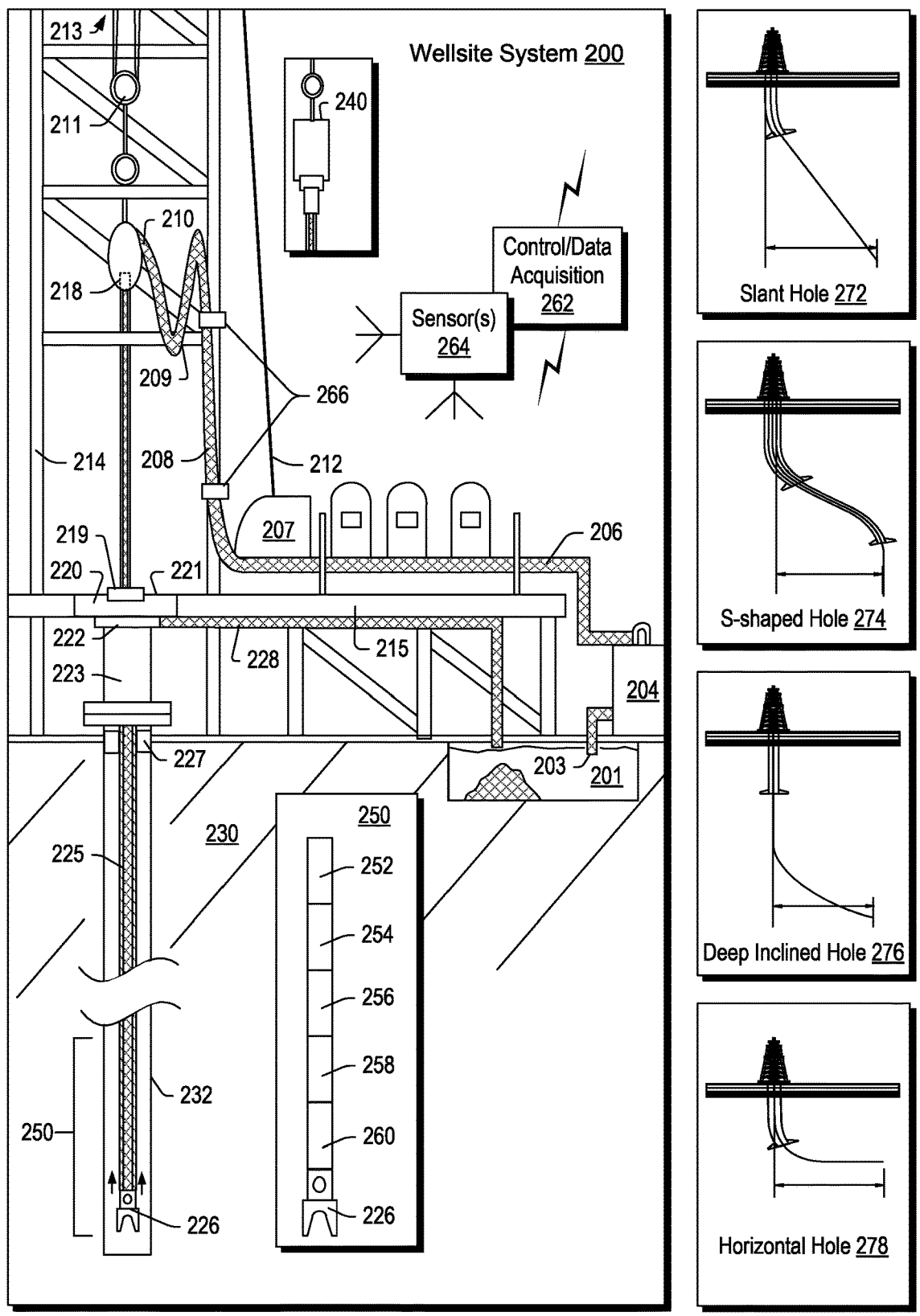
FIG. 2 illustrates an example of a system and examples of types of holes.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight on bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As to standpipe pressure (SPPA), it can be measured via one or more sensors, as indicated in FIG. 2. SPPA can be a summation of pressure loss in an annulus, pressure loss in a drillstring, pressure loss in a bottom hole assembly (BHA) and pressure loss across a bit. Standpipe pressure can be adjustable, for example, to maintain it within limits during one or more operations. As an example, standpipe pressure can respond to flow rate of drilling fluid, for example, as controlled via one or more pumps. As an example, where a flow rate changes, a corresponding response may be seen in standpipe pressure. As to drilling, keeping the SPPA too low may result in a washed out bit nozzle; noting that pump packing may crack and make joints loose. Conversely, keeping the SPPA too high during drilling can result in increased mud density and viscosity. Various types of rheological models may be utilized to determine an effective standpipe pressure in a wellbore during drilling.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 3:
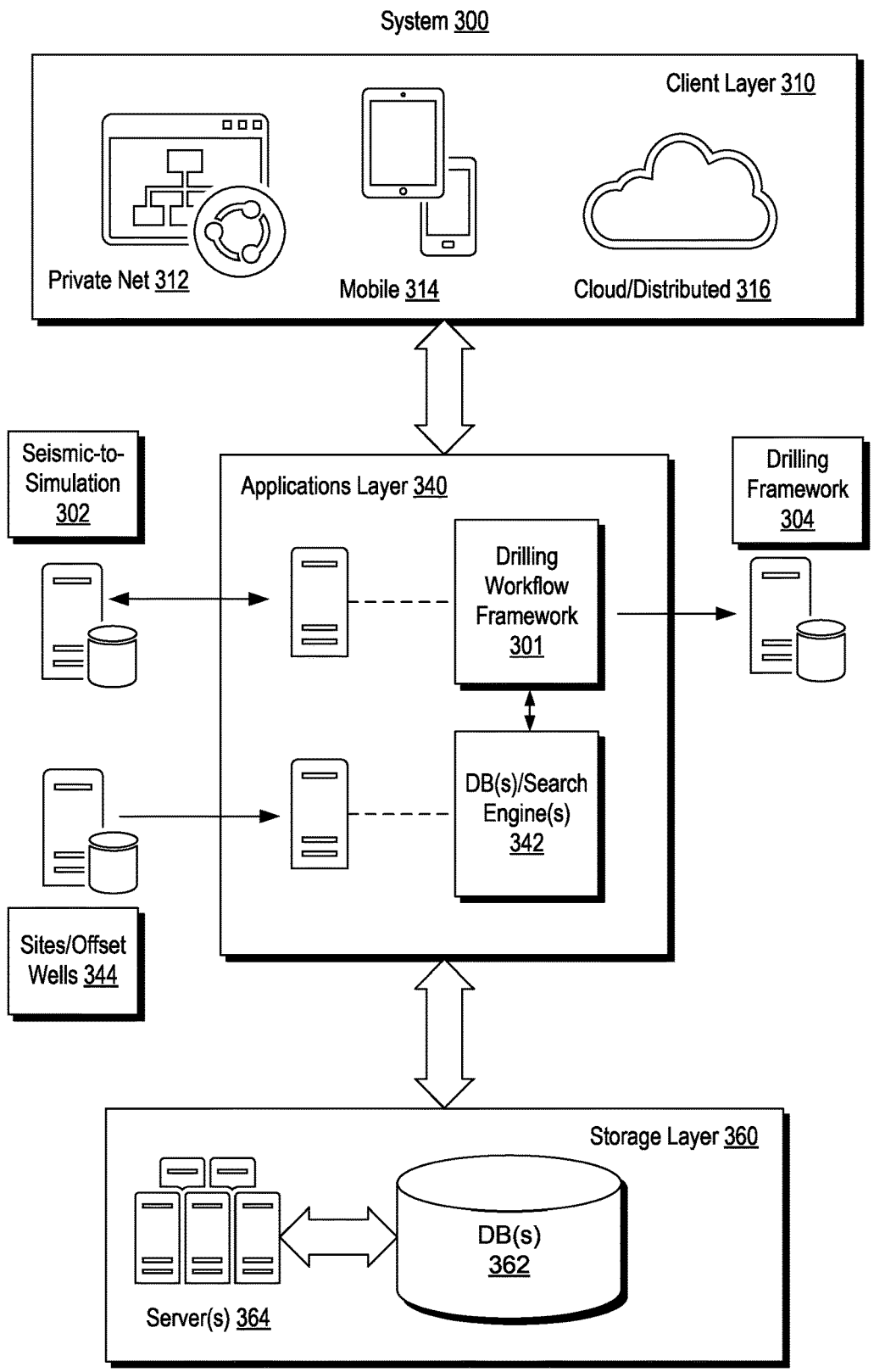
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines modules, for example, to access one or more databases 344 for sites and/or offset wells.

As an example, the database management component 342 can include one or more search engine modules that provide for searching one or more information that may be stored in one or more data repositories. As an example, the STUDIO E&P™ knowledge environment (Schlumberger Ltd., Houston, Texas) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring a search result(s) (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 462. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300, may include features of the AZURE™ architecture (Microsoft Corporation, Redmond, WA). As an example, a cloud portal block can include one or more features of an AZURE™ portal that can manage, mediate, etc. access to one or more services, data, connections, networks, devices, etc.

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
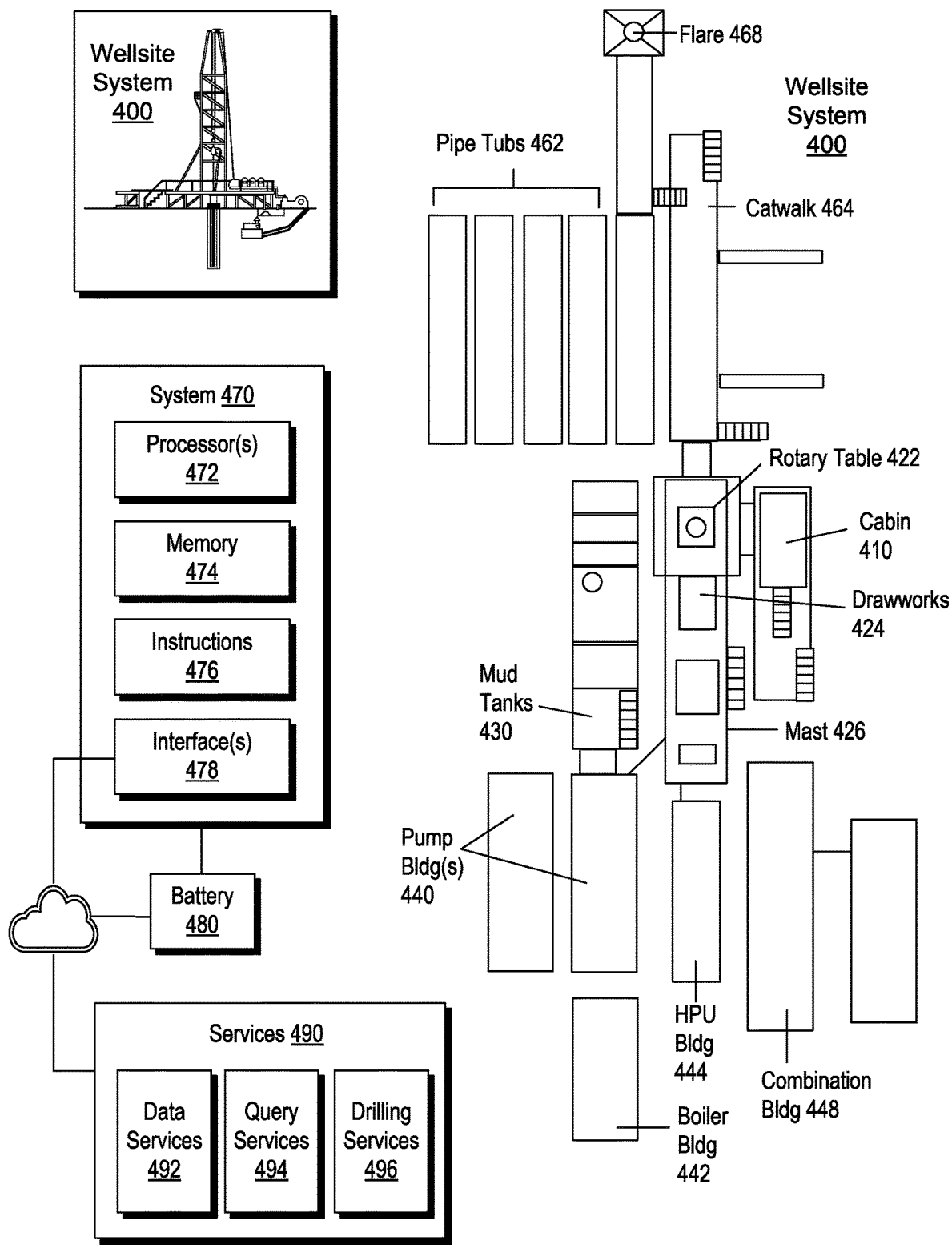
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL® framework. As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory (ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review. As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
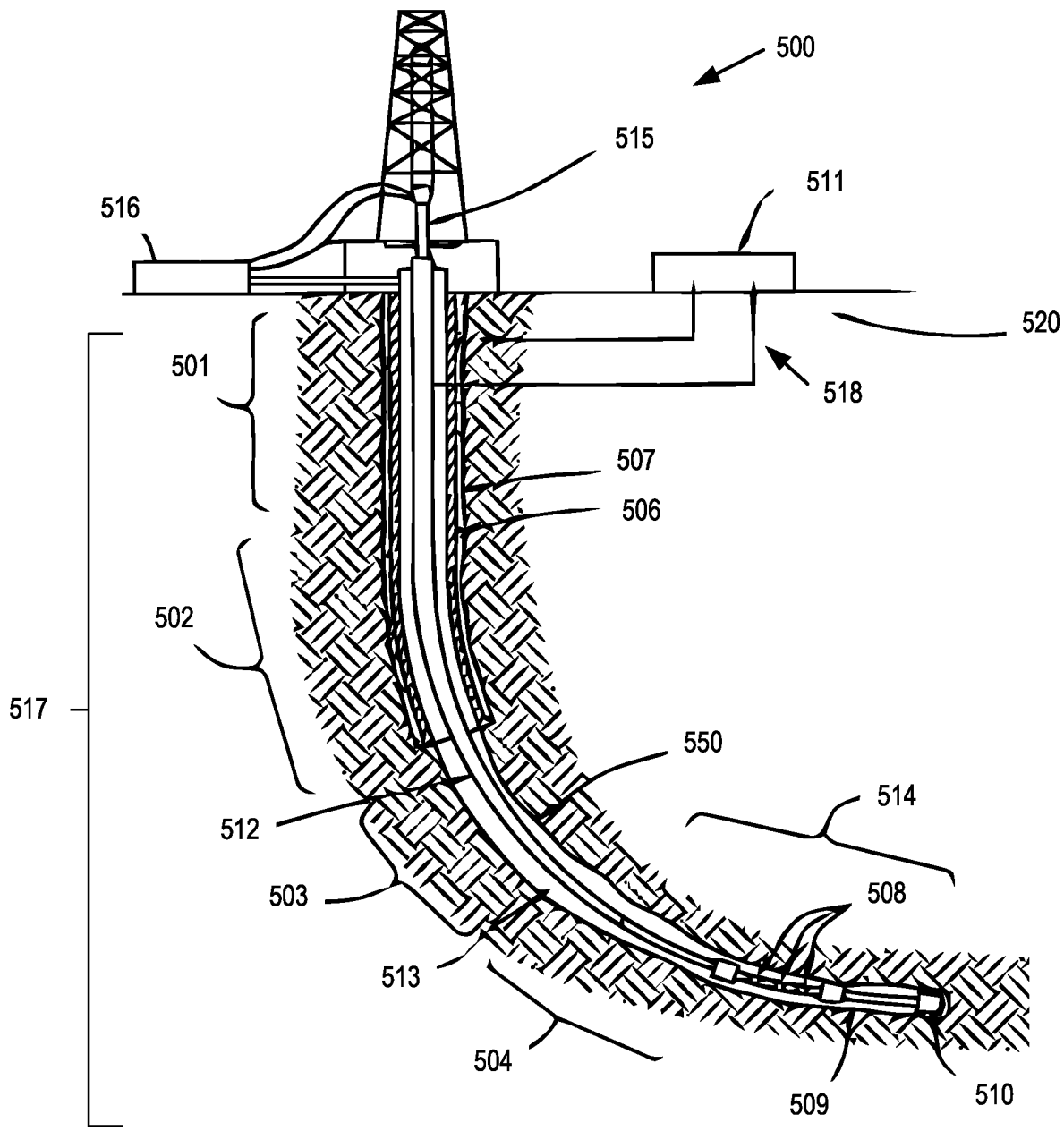
FIG. 5 illustrates an example of a system.

FIG. 5 shows a schematic diagram depicting an example of a drilling operation of a directional well in multiple sections. The drilling operation depicted in FIG. 5 includes a wellsite drilling system 500 and a field management tool 520 for managing various operations associated with drilling a bore hole 550 of a directional well 517. The wellsite drilling system 500 includes various components (e.g., drillstring 512, annulus 513, bottom hole assembly (BHA) 514, kelly 515, mud pit 516, etc.). As shown in the example of FIG. 5, a target reservoir may be located away from (as opposed to directly under) the surface location of the well 517. In such an example, special tools or techniques may be used to ensure that the path along the bore hole 550 reaches the particular location of the target reservoir.

As an example, the BHA 514 may include sensors 508, a rotary steerable system 509, and a bit 510 to direct the drilling toward the target guided by a pre-determined survey program for measuring location details in the well. Furthermore, the subterranean formation through which the directional well 517 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 501, 502, 503 and 504) corresponding to the multiple layers in the subterranean formation. For example, certain sections (e.g., sections 501 and 502) may use cement 507 reinforced casing 506 due to the particular formation compositions, geophysical characteristics, and geological conditions.

In the example of FIG. 5, a surface unit 511 may be operatively linked to the wellsite drilling system 500 and the field management tool 520 via communication links 818. The surface unit 811 may be configured with functionalities to control and monitor the drilling activities by sections in real time via the communication links 518. The field management tool 520 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 518 according to a drilling operation workflow. The communication links 518 may include a communication subassembly.

During various operations at a wellsite, data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real time data associated with one or more operations such as, for example, a drilling operation or drilling operations. As an example, consider the PERFORM™ toolkit framework (Schlumberger Limited, Houston, Texas).

As an example, a service can be or include one or more of OPTIDRILL™, OPTILOG™ and/or other services marketed by Schlumberger Limited, Houston, Texas.

The OPTIDRILL™ technology can help to manage downhole conditions and BHA dynamics as a real time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO™ framework).

The OPTILOG™ technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Texas), which may include information from various operations (e.g., drilling operations) as associated with various drill bits, drilling conditions, formation types, etc.

As an example, one or more QTRAC services (Schlumberger Limited, Houston Texas) may be provided for one or more wellsite operations. In such an example, data may be acquired and stored where such data can include time series data that may be received and analyzed, etc.

As an example, one or more M-I SWACO™ services (M-I L.L.C., Houston, Texas) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX™ services (e.g., via the ONE-TRAX software platform, M-I L.L.C., Houston, Texas) may be provided for one or more wellsite operations. In such an example, data may be acquired and stored where such data can include time series data that may be received and analyzed, etc.

As an example, various operations can be defined with respect to WITS or WITSML, which are acronyms for well-site information transfer specification or standard (WITS) and markup language (WITSML). WITS/WITSML specify how a drilling rig or offshore platform drilling rig can communicate data. For example, as to slips, which are an assembly that can be used to grip a drillstring in a relatively non-damaging manner and suspend the drillstring in a rotary table, WITS/WITSML define operations such as "bottom to slips" time as a time interval between coming off bottom and setting slips, for a current connection; "in slips" as a time interval between setting the slips and then releasing them, for a current connection; and "slips to bottom" as a time interval between releasing the slips and returning to bottom (e.g., setting weight on the bit), for a current connection.

Well construction can occur according to various procedures, which can be in various forms. As an example, a procedure can be specified digitally and may be, for example, a digital plan such as a digital well plan. A digital well plan can be an engineering plan for constructing a wellbore. As an example, procedures can include information such as well geometries, casing programs, mud considerations, well control concerns, initial bit selections, offset well information, pore pressure estimations, economics and special procedures that may be utilized during the course of well construction, production, etc. While a drilling procedure can be carefully developed and specified, various conditions can occur that call for adjustment to a drilling procedure.

As an example, an adjustment can be made at a rigsite when acquisition equipment acquire information about conditions, which may be for conditions of drilling equipment, conditions of a formation, conditions of fluid(s), conditions as to environment (e.g., weather, sea, etc.), etc. Such an adjustment may be made on the basis of personal knowledge of one or more individuals at a rigsite. As an example, an operator may understand that conditions call for an increase in mudflow rate, a decrease in weight on bit, etc. Such an operator may assess data as acquired via one or more sensors (e.g., torque, temperature, vibration, etc.). Such an operator may call for performance of a procedure, which may be a test procedure to acquire additional data to understand better actual physical conditions and physical phenomena that may occur or that are occurring. An operator may be under one or more time constraints, which may be driven by physical phenomena, such as fluid flow, fluid pressure, compaction of rock, borehole stability, etc. In such an example, decision making by the operator can depend on time as conditions evolve. For example, a decision made at one fluid pressure may be sub-optimal at another fluid pressure in an environment where fluid pressure is changing. In such an example, timing as to implementing a decision as an adjustment to a procedure can have a broad ranging impact. An adjustment to a procedure that is made too late or too early can adversely impact other procedures compared to an adjustment to a procedure that is made at an optimal time (e.g., and implemented at the optimal time).

A procedure may be a standard operating procedure (SOP), which can be a specific procedure to perform a specific operation. An SOP can be tailored to a particular well, for example, to be ready at the onset of well construction activities. In such an example, the SOP may be adjustable via human interaction, for example, as explained above with respect to conditions that may occur.

As an example, when an adjustment occurs to a procedure, an evaluation of the procedure as originally set forth and as adjusted may be performed to determine a degree of compliance with the procedure as originally set forth. A degree of compliance for a procedure is one manner by which activities and/or conditions may be tracked during well construction. For example, where an adjustment occurs that causes an actual executed procedure to deviate from a standard operating procedure, an inference can be made that some condition or conditions gave rise to the decision to make the adjustment. As explained with respect to the example system 400 of FIG. 4, various procedures may be automated for execution where one of the procedures may be a standard operating procedure (SOP). In such a system, a comparison between the SOP and the actual procedure, can be utilized to filter data acquired before, during and/or after execution of the actual procedure, for example, to understand one or more underlying reasons why a deviation occurred (e.g., a degree of non-compliance or degree of compliance). Such an approach can expedite assessment of well construction activities and, for example, can allow for identification of conditions, behaviors, physical phenomena, etc., that can be utilized to control well construction. In such an example, control may be for a well being constructed, a well to be constructed, etc.

Figure 6:
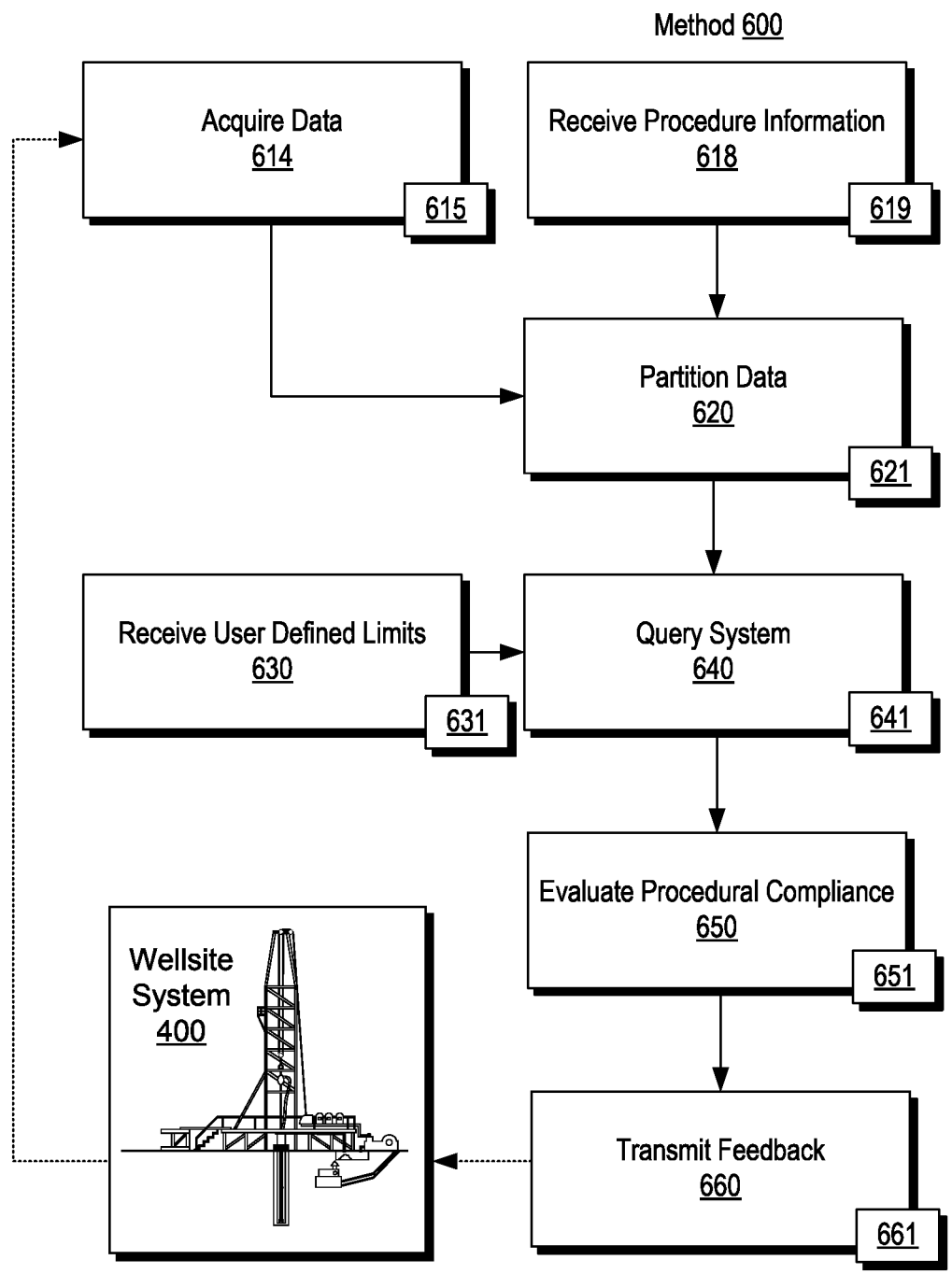
FIG. 6 illustrates an example of a method.

FIG. 6 shows an example of a method 600 that is described with respect to the wellsite system 400. As an example, the method 600 may be implemented using the system 470 of FIG. 4. The method 600 can include generating information that can be rendered to one or more displays, for example, as images, graphical user interfaces (GUIs), alerts, etc. For example, the cabin 410 can include one or more displays where information is rendered during execution of the method 600. As explained, the system 400 can include various features of the wellsite system 200 and may perform various actions, which may include, for example, one or more actions described with respect to the system 500 of FIG. 5.

As an example, actions can include well control actions, which may utilize various types of technologies to a maintain desired pressure on an open formation exposed to a wellbore, for example, to prevent or direct the flow of formation fluids into the wellbore. Such technologies can encompass estimation of formation fluid pressures, strength of subsurface formations and use of casing and mud density to offset pressures in a predictable manner, etc. As an example, one or more well control procedures can include one or more operational procedures to safely stop a well from flowing should an influx of formation fluid occur. To conduct various well control procedures, one or more valves can be installed at the top of a well to enable wellsite personnel and/or equipment to close the well in response to one or more conditions, etc.

In the example of FIG. 6, the method 600 includes an acquisition block 614 for acquiring data, a reception block 618 for receiving procedure information, a partition block 620 for partitioning data based at least in part on at least a portion of the procedure information, a reception block 630 for receiving one or more user defined limits, a query block 640 for querying a system using a query based at least in part on the partitioning of the data and the one or more user defined limits, an evaluation block 650 for evaluating procedural compliance using results from the query, and a transmission block 660 for transmitting feedback to the wellsite system 400 based at least in part on the evaluating procedural compliance. FIG. 6 also shows blocks 615, 619, 621, 631, 641, 651 and 661 that can be instructions such as computer-readable instructions in computer-readable media (CRM).

In the example of FIG. 6, the method 600 can be a control method that operates in a loop (e.g., a control loop) that includes at least one wellsite system. As an example, the method 600 may operate for a plurality of wellsite systems where, for example, feedback may be transmitted to one or more of the plurality of wellsite systems. For example, acquired data may be for a particular well and feedback may be for a well that is offset from that particular well. In such an example, the method 600 may operate for a field that includes the plurality of wellsite systems or otherwise includes a plurality of wells constructed, being constructed or to be constructed.

The method 600 can be implemented in a manner that automatically identifies a degree of adherence to standard operating procedures (SOPs). SOPs define sequences of operations, with associated parameter ranges and expected outcomes, to achieve execution goals. The method 600 can include determining a degree of compliance of execution activities to the intended procedures (see, e.g., the evaluation block 650).

A control system can implement the method 600 of FIG. 6. Such a system can utilize the concept of partitions, for example, to isolate sections in time series data where specific SOPs are likely to be executed. Examples of partitions can include field actions such as going on bottom, on bottom rotary drilling, pulling out of hole, etc. Such partitions can be automatically segmented from data using base states, which can include rig states, slips states and/or drill states. The partitions can be created on demand and can be used in downstream processing where operating procedures are modeled as queries and run on partitions to answer a question as to whether a specific operating procedure has been executed as prescribed (e.g., a degree of compliance, which may be based on criteria in an SOP and how many criteria are met, degree to which met or not met, etc.).

Challenges exist in constructing queries for procedural adherence metrics. For example, consider challenges as to developing compact representations from noisy sensor data and in modeling complex drilling operations to compare with these representations. As an example, such representational challenges can be achieved utilizing a modified Symbolic Aggregate approXimation (SAX) technique. In such an approach, modeling of drilling operations can be addressed via use of a probabilistic Markov model. For example, partitioned time-series data can be processed through a customized SAX method where use of an SOP (or SOPs) and a driller's instructions' operational limits can create a dimensionally reduced sequence of symbols. In such an example, one or more Markov models can be utilized to encode industry heuristics and process symbols searching for patterns which indicate if observed operations are in accordance with the SOP. In such an example, the observed operations can be via one or more sensors that acquire data as to operations at a rigsite. For example, consider a weight on bit (WOB) sensor that can acquire weight data with respect to time, which can indicate various rigsite operations.

Weight on bit (WOB) can be provided in part by drill collars, which are thick-walled tubular pieces machined from solid bars of steel (e.g., plain carbon steel, etc.) and/or nonmagnetic nickel-copper alloy or other nonmagnetic premium alloys. Gravity can act on the large mass of the drill collars to provide downward force for a bit to efficiently break rock. To accurately control the amount of force applied to the bit, a driller and/or a control system can monitor surface weight measured via one or more sensors while the bit is just off the bottom of a wellbore, where a drillstring (and the drill bit) is slowly and carefully lowered until it touches bottom and as the driller continues to lower the top of the drillstring such that more and more weight is applied to the bit, and correspondingly less weight is measured as hanging at the surface. As an example, if the surface measurement shows 20,000 pounds (e.g., 9080 kg) less weight than with the bit off bottom, then a control system can determine 20,000 pounds (e.g., 9080 kg force) force on the bit (e.g., in a vertical hole). In some operational scenarios, one or more types of downhole MWD sensors may be available to include in a drillstring to measure WOB downhole, which may be more accurate than surface measurements. As an example, a MWD sensor may measure WOB and transmit the measured WOB data to the surface (e.g., a surface control system, a surface controller, etc.). As may be appreciated, WOB is a variable that can change during drilling operations and may be utilized in a time series approach to determine types of actions, degree of actions, success of actions, failure of actions, etc.

As mentioned, modeling of drilling operations can be addressed via use of a probabilistic Markov model. In probability theory, a Markov model is a stochastic model that can be utilized to model randomly changing systems. In a Markov model, it is possible to assume that future states depend on a current state and not on events that occurred before the current states (e.g., assuming the Markov property). Such an assumption enables reasoning and computation with the model that would otherwise be intractable. For this reason, in the fields of predictive modelling and probabilistic forecasting, it is desirable for a given model to exhibit the Markov property.

A hidden Markov model is a Markov chain for which a state (e.g., or states) is not defined to be fully observable (e.g., consider a partially observable state). In such an example, observations can be related to a state of the system, but they can be insufficient to precisely determine the state. For example, referring again to the WOB example, WOB may be a measurement from which a state can be inferred yet the WOB does not fully define the state (e.g., a WOB measurement may not provide a 100 percent probability that the WOB measurement, as an observation, is an indicator that the state exists or existed).

As an example, a hidden Markov model approach can handle a sequence of observations where, for example, the Viterbi algorithm can be implemented to compute the most-likely corresponding sequence of states, where a forward algorithm can compute the probability of the sequence of observations, and where the Baum-Welch algorithm can estimate the starting probabilities, the transition function, and the observation function of a hidden Markov model. As an example, a forward recursion algorithm and/or a backward recursion algorithm may be utilized (e.g., consider use of one or more forward-backward HMM algorithms).

Hidden Markov models find use in speech recognition, where the observed data are the speech audio waveforms and a hidden state is the corresponding spoken text. In such an example, the Viterbi algorithm finds the most likely sequence of spoken words given the speech audio. The Viterbi algorithm is a dynamic programming algorithm for finding the most likely sequence of hidden states (e.g., a Viterbi path) that results in a sequence of observed events, which may be in the context of Markov information sources and hidden Markov models.

As to oilfield operations (e.g., such as drilling and related operations), measurements may be observations (e.g., observed data) and an algorithm applied to find the most likely sequence of actions performed in the field. As an example, a system can receive data, process the data utilizing one or more hidden Markov models and one or more Viterbi algorithms to output the most likely sequence of "hidden" states (e.g., a Viterbi path) that results in the sequence of observed events (e.g., observed data). In such an example, the system can be a control system that includes one or more interfaces that can receive data and that can output one or more signals to control one or more field operations associated with an oilfield. Such an approach can improve control of field operations. For example, control can be improved over human observation of data where a human may attempt to determine "hidden" states and decide how to control one or more field operations based thereon. As an example, an oilfield control system can utilize a hidden Markov model and a Viterbi algorithm to determine a sequence of "hidden" states where such states can pertain to actions and/or conditions in a borehole or performed in relationship to a borehole that are not readily assessable such as text generated via speech recognition, which may be confirmed to a high degree of accuracy by a human that can understand the audio (spoken words) and that can understand corresponding text.

As an example, a method can include evaluating a sequence output by a system to a SOP (e.g., as a sequence) where such an approach can include natural language processing and/or other language processing to relate the sequence to text that describes a sequence in a SOP, where particular members of the sequence may include numeric specifications (e.g., numbers, limits, ranges, etc.).

In various example trials, a system received and processed historical data sets and determined degree of procedural adherence as to various SOPs. In such trials, queries were constructed based on the SOPs in the driller's instructions and data were automatically partitioned into appropriate on bottom rotary and slide drilling partitions. In such trials, compact representations were generated (e.g., via a SAX approach) and queries were executed on flow rate, rotation, weight on bit (WOB) and rate of penetration (ROP) to evaluate the level of compliance to the procedures.

Results of the trials demonstrated that such a system can provide a robust automated way to analyze large datasets and extract information from drilling data to assess degree of compliance to one or more SOPs. Such metrics can be utilized to improve well construction outcomes, for example, in one or more control loops.

As an example, a method can include automatically identifying the degree of compliance of operations to a standard operational procedure (SOP). In such an example, the SOP defines a sequence of operations and operating limits that are to be adhered to for a procedure to be conducted. Such a method can determine if the SOP, as defined, has been adhered to and to what degree it has been adhered to in terms of actual procedures based on observations (e.g., data acquired by one or more sensors, etc.).

As an example, a method can utilize a compact representation from sensor data, which can be or include noisy sensor data. Such a compact representation can utilize a Symbolic Aggregate approximation (SAX) approach. Such a method can include modeling complex drilling operations to identify patterns in data which can be addressed using probabilistic Markov modeling. In such an approach, the probabilistic model can help as operation sequences are accepted as valid with a margin of variance.

As an example, time-series data can be processed through SAX to create a dimensionally reduced sequence of symbols based on limits defined set in an SOP. A Markov model, with a set of industry heuristics, can process the symbols, for example, searching for patterns that correspond to the likelihood of operations aligning with the SOP.

As to limits, various graphical user interfaces (GUIs) may be rendered to a display or displays where a user may interact with one or more GUIs to input one or more limits. As an example, a pair of limits can define a band, which may be an operational band with relevance to one or more SOPs. A GUI can include a plot of data where one or more limits may be rendered with respect to the plot, which may be adjustable by a user (e.g., via touch, voice, mouse, stylus, etc.) and/or determined via information stored in one or more files (e.g., an operational file as may be associated with one or more SOPs, etc.).

As an example, a method can include determining a degree of compliance via comparing output (e.g., results of a query or queries) with a SOP. As an example, a method can provide automatic and accurate identification of compliance to a SOP.

As an example, a method may be implemented in an automated and robust manner to analyze large datasets and to extract information out of trends to assess the compliance to one or more SOPs. As an example, a method may be employed in real time where output can indicate whether SOP compliance is occurring and, for example, degree to which compliance is being achieved. In such an example, a system can output one or more control signals that can aim to comply with a SOP. For example, such one or more control signals may be as to an ongoing operation and/or as to an operation to be performed. As an example, a real time system can help to ensure that one or more SOPs are being followed systematically.

As an example, a method can include utilizing partitions and queries. In such an example, a partition can be an interval of interest (e.g., in a time domain, in a depth domain, etc.) that can be focused based on a specific SOP. In such an example, queries can model one or more SOPs. As an example, queries can be run on partitions to evaluate results, to decide degree of compliance to one or more SOPs.

Some examples of SOPs can be described as below (e.g., via translation to particular operations, optionally in a natural language, etc.):

Example 1: When going on bottom, have you staged up RPM/flowrate a prescribed and confirmed an expected response (e.g., surface torque/standpipe pressure)?

Example 2: During on bottom drilling (e.g., rotary or sliding), have you followed the prescribed RPM/flowrate/WOB/differential pressure/ROP?

Example 3: When going on bottom, have you ramped up WOB as prescribed and confirmed an expected response (e.g., torque)?

Example 4: When drilling off, have you ramped down WOB as prescribed and confirmed an expected response (e.g., torque)?

Example 5: Have you made hole to the prescribed depth?

Example 6: Have you performed the shock and vibration mitigation procedure when required?

Example 7: After slide drilling, have you washed up and reamed down the drilled section? If so, how many times?

Example 8: Before making a new connection, have you taken new torque and drag readings and confirmed they are within prescribed limits?

Example 9: Have you taken slow circulation rate reading at the prescribed intervals (e.g., time/footage drilled)

Example 10: Have you performed a flow check as prescribed?

Example 11: When tripping, have you followed the prescribed tripping speed limits and confirmed an expected response (e.g., tank levels)?

Example 12: Before tripping out, have you circulated for the prescribed time (e.g., number of bottoms up)?

Example 13: When tripping in, have you filled pipe as prescribed (for instance reciprocating)?

Example 14: After tripping in, have you broken the mud gel?

Example 15: When tripping out, have you kept the hole full during a relevant period of time?

Example 16: When tripping out, have you ensured to alternate connection breaks on stands?

Example 17: Have you taken surveys at the prescribed intervals?

Below, some examples of partitions and query processors are presented that can support the above described standard operating procedures, where P represents partition and Q represents query:

Example P1: From off bottom to going on bottom

Example P2: Sliding done, pick up and get back on bottom

Example P3: When coming off bottom

Example P4: When coming off bottom pre-slips

Example P5: When going on bottom

Example P6: When on bottom drilling

Example P7: When on bottom sliding

Example P8: After drilling to start pulling out

Example P9: Tripping out of hole

Example Q1: Actuator auto staging

Example Q2: Actuator multi staging

Example Q3: Actuator stable

Example Q4: Actuator staging

Example Q5: Keep within bounds

Example Q6: Response staging

As an example, a method may include utilizing one or more of the foregoing examples listed above where translation can occur into a partition or a combination of partitions and a query or queries to understand if a driller (or whoever/whatever is concerned) is compliant with a SOP and to what degree. As an example, a method can include determining whether a controller or control system is compliant with one or more SOPs. In such an example, one or more control actions may be taken via issuance of one or more control signals where an aim can be to comply to a greater degree with one or more SOPs.

As an example, consider an example SOP: When going on bottom, has the flow rate been staged up into a prescribed level and confirmed an expected response of standpipe pressure?

For the particular example SOP, a method can include considering relevant parts of data, which can include the partition of "When going on bottom". This partition can be explained as the period in between a bit being off bottom to the time of tagging bottom (e.g., contacting the bottom of a hole). As explained, a system can provide for sensing weight on bit (WOB), which can vary depending on operation being performed. In the foregoing "When going on bottom" example, a sensed weight on bit (e.g., observed data) can change with respect to time for the bit being off bottom and for the bit tagging bottom (e.g., being in contact with a bottom of a borehole). In such an approach, the partition does not necessarily reflect a precise location of tagging bottom and, for example, partitions can include neighboring data. In such a manner, an interval of interest can be established.

In the foregoing example, an example query for the SOP can be: Actuator staging or actuator auto staging query for the flow rate channel and response staging query for the standpipe pressure. In such an example, one may expect a response channel (e.g., sensor data channel) to remain stable if the actuator channel is stable for a successful staging.

The search result of the foregoing example query can be, for example, "partition is staged" or "partition is not staged" (e.g., a binary state result as "0" or "1", digitally, or another type of code) or it may be more complex. As an example, further information can be presented such as, flow rate was not staged or if flow rate was staged, but standpipe pressure was not stable with the location, duration and degree of the stability, etc. In the foregoing example, the search result can be indicative of whether a SOP was followed or not. An assessment of the search result can determine whether a SOP was followed or not. For example, if the SOP includes staging for the partition, the "not staged" search result can be assessed to mean that the SOP was not followed. Where a control system is utilized, a control signal can be issued using the assessment, for example, to cause staging as may be appropriate (e.g., to cause a pump to ramp up a flow rate, etc.).

As mentioned, an example SOP can involve, when going on bottom, staging up a flow rate (FLWI) to a prescribed level and confirming an expected response of standpipe pressure (SPPA). In such an example, the flow rate (FLWI) may be staged to a particular value and then ramped up to a desired operational value where standpipe pressure (SPPA) can be assessed to confirm that such staging occurred. As to an interval of interest, it can be "going on bottom", which may be discerned from one or more channels of data. For example, a query can involve, when going on bottom, determining whether FLWI was staged appropriately and, for example, determining whether SPPA responded as expected. In such an example, SPPA may be expected to be stabilized when a particular FLWI has been achieved. As to rotation of a bit as to drilling, revolutions per minute (RPM) may be controlled and a torque response expected. Other examples can pertain to other types of operations (e.g., taking a bit off bottom, tripping in, tripping out, etc.).

One or more relevant intervals of interest can be discerned from one or more channels of data. For example, a method can consider a partition that corresponds to "when going on bottom", which can be discerned from one or more channels of data. This particular partition can correspond to a period of time between a bit being off bottom and the bit tagging bottom. As to a query for the SOP, consider formulating an "actuator staging" or "actuator auto staging" query for the flow rate data channel (FLWI) and a "response staging" query for the standpipe pressure channel (SPPA). Thus, two query terms can be formulated and utilized with respect to the established interval of interest per the aforementioned partition to determine information as to staging and thus SOP compliance. In the foregoing example, a driller (e.g., or control system) may expect the response per the SPPA data channel to remain stable if the actuator channel is stable for a successful staging. As to results from query-based searching, consider, for example, "partition is staged", "partition is not staged", "flow rate was not staged", "flow rate staged, but standpipe pressure not stable with respect to X" (e.g., where X can be one or more of location, duration, degree, etc., of stability). As mentioned, a user may input one or more limits where such limits may pertain to data values such as FLWI and/or SPPA in the foregoing example.

Figure 7:
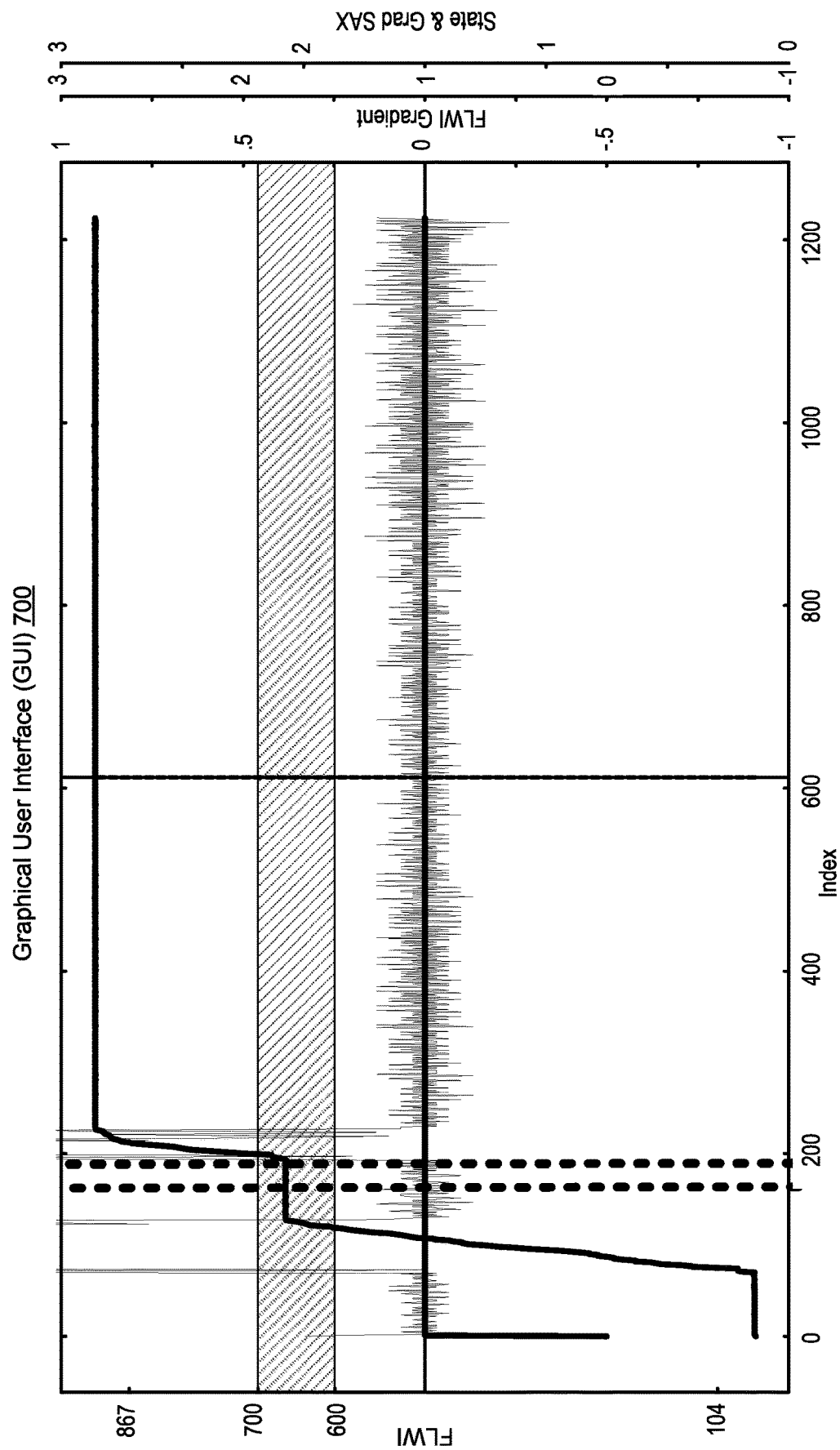
FIG. 7 illustrates an example of a graphical user interface.
Figure 8:
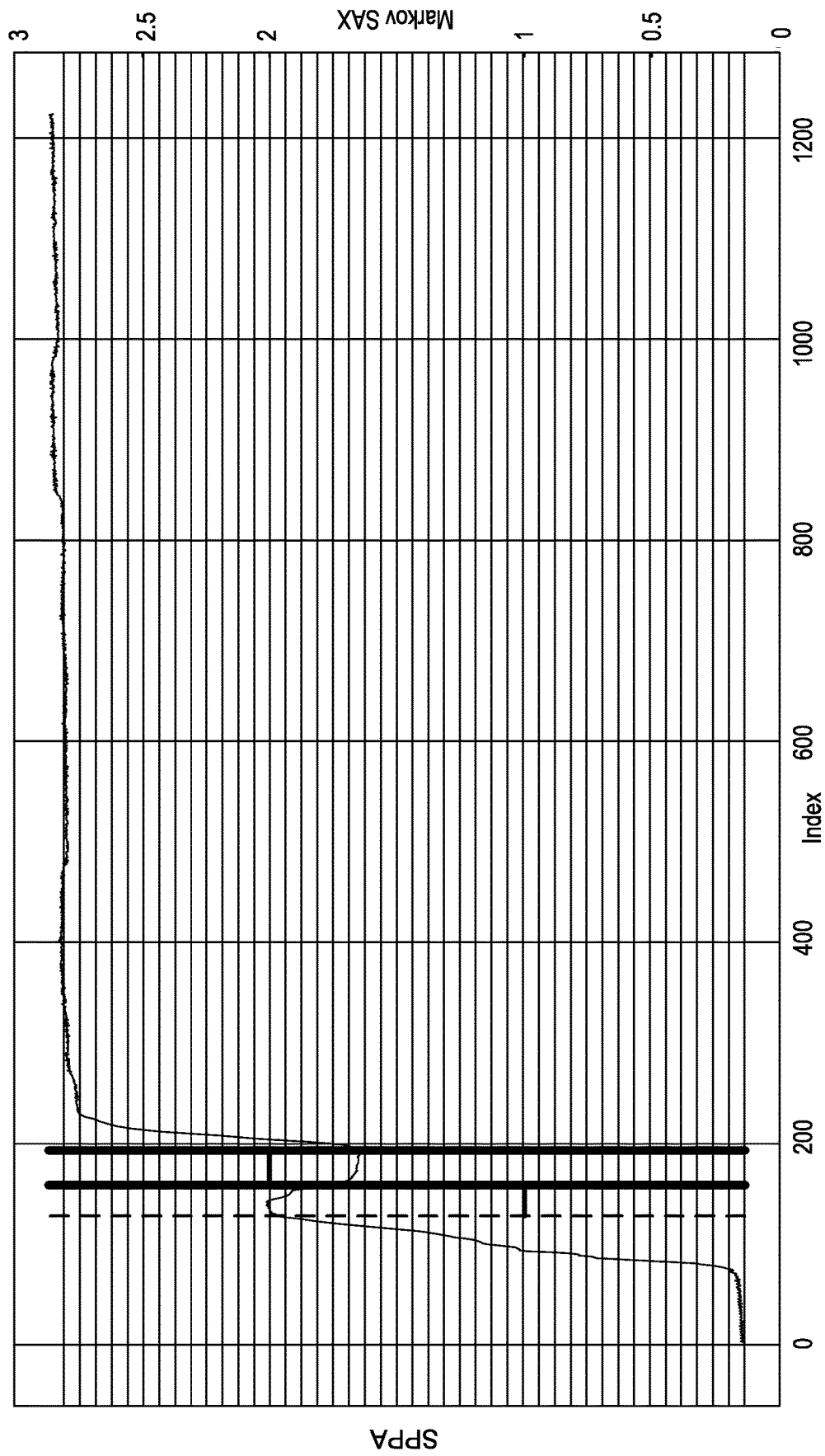
FIG. 8 illustrates an example of a graphical user interface.

FIGS. 7 and 8 show examples of graphical user interfaces (GUIs) 700 and 800, respectively, where for a staged flow rate, standpipe pressure is staged. The GUIs 700 and 800 can include results from query-based searching, for example, as to the aforementioned SOP that involves, when going on bottom, staging up a flow rate (FLWI) to a prescribed level and confirming an expected response of standpipe pressure (SPPA). In FIG. 7, the scales to the right side of the plot include FLWI gradient, state and gradient SAX. The latter two correspond to the representation of the SAX representation of the original and the gradient of the actuator channel. In various plots, Markov SAX is given, which is the representation of the Markov smoothed SAX representation of the response channel.

The GUI 700 shows a plot for an example of successful actuator staging (flow rate in channel, FLWI). The SOP is about staging the pumps (e.g., flow rate in channel, FLWI) before reaching a drilling flow rate. The continuous line is the channel of flow rate in (FLWI), starting from coming out of slips and continuing until a certain amount of footage of drilling is accomplished. The relatively high frequency varying line is the gradient of the actuator channel (e.g., for actuation of equipment, decision making, etc.). The shaded area that extends horizontally across the X axis represents a user's input on staging level to be analyzed (SOP). For example, a user may input limits such as 600 FLWI to 700 FLWI as represented at points on the Y axis. These limits can pertain to an SOP (e.g., numeric values in an SOP that correspond to actual values of FLWI). The limits can be utilized for assessing SOP compliance and can be utilized for rendering indicia to a GUI to more readily allow a user to view and understand operational behavior. An area between the vertical dashed lines shows the detected staging for the flow rate channel (FLWI). In particular, in the area that corresponds to the limits, the FLWI channel data transition to a relatively constant value and then increase, as marked by the vertical dashed line at approximately 300 along the index. In the GUI 700, the gradient of the actuator channel (FLWI gradient) is centered on zero with normalized limits of +1 and −1.

The GUI 800 shows a plot for a successful example of response staging of standpipe pressure (SPPA) together with a staged actuator of pumps as shown in the previous plot of the GUI 700 of FIG. 7. In the GUI 800, the thin continuous line is the standpipe pressure channel (SPPA) starting from coming out of slips and continuing until a certain amount of footage of drilling. A line from the dashed line to the thick solid line, which extends across the Y axis, represents the interval of staged flow rate (FLWI) on the SPPA plot. The area between the continuous thick lines that extend across the Y axis at particular X axis values shows the detected staging for the standpipe pressure channel (SPPA), which represents the actual staged interval synchronous between SPPA and flow rate (FLWI).

Figure 9:
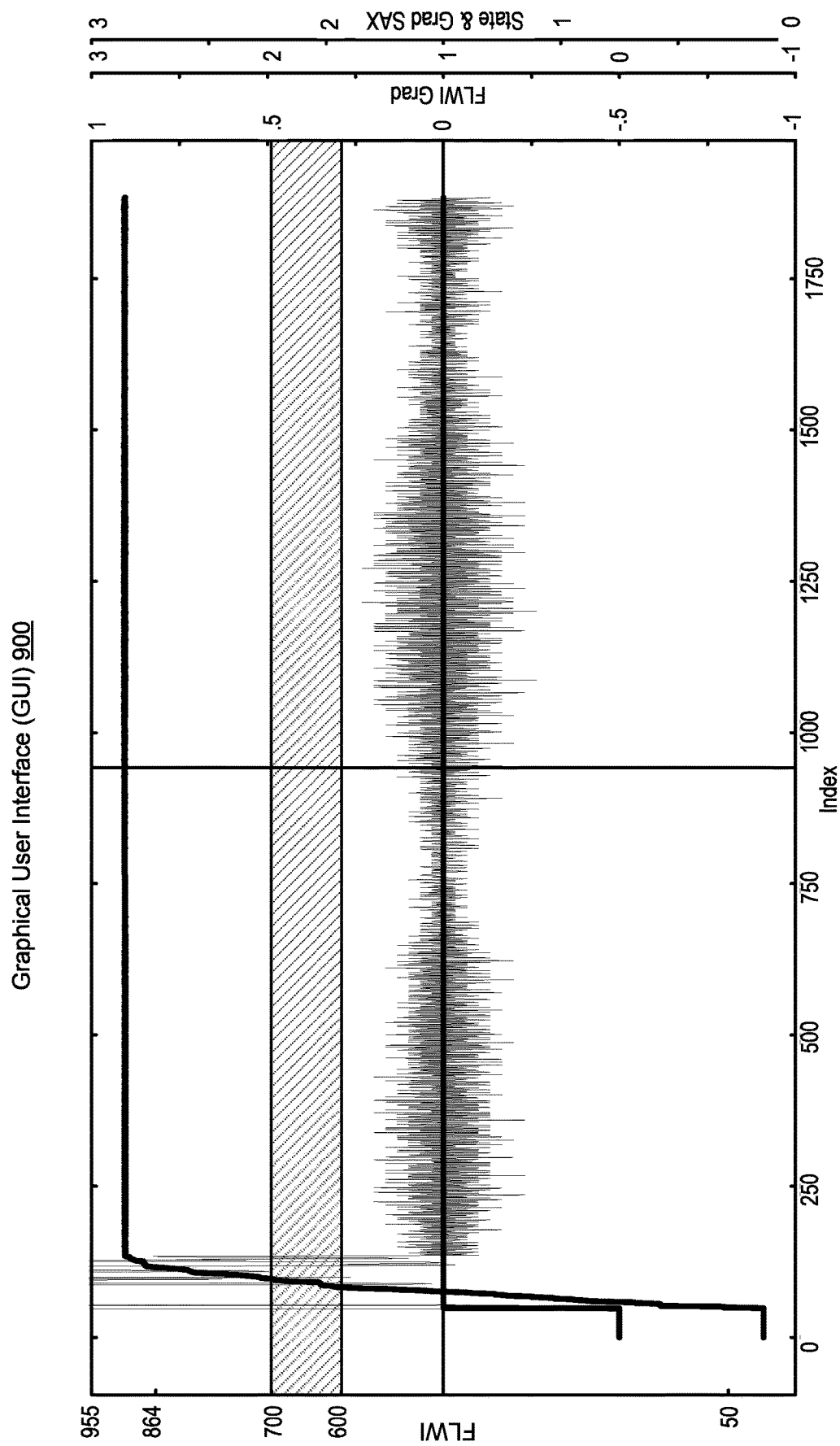
FIG. 9 illustrates an example of a graphical user interface.

FIG. 9 shows an example GUI 900 that includes a plot for an unsuccessful example of actuator staging (flow rate in channel, FLWI). In the example of FIG. 9, the SOP specifies information as to staging the pumps (flow rate in channel) before reaching the drilling flow rate. The continuous line is the channel of flow rate in starting from coming out of slips and continuing until a certain amount of footage of drilling is accomplished. The high frequency line is the gradient of the actuator channel. The shaded area that extends across the X axis represents a user's input on staging level to be analyzed (e.g., per the SOP). The area is defined by limits, which can be received by a system and utilized to assess compliance with an SOP.

Figure 10:
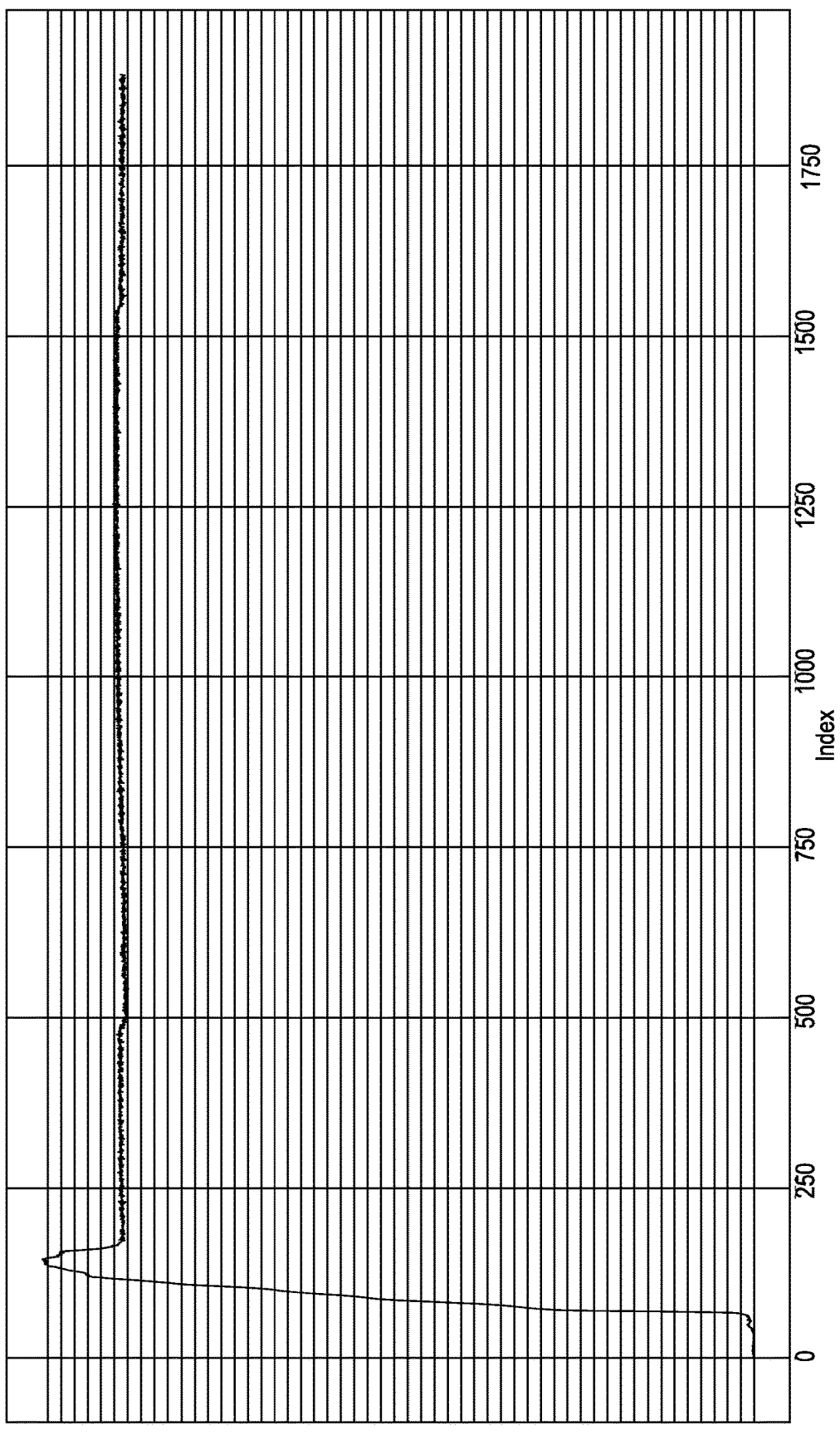
FIG. 10 illustrates an example of a graphical user interface.

FIG. 10 shows an example GUI 1000 that includes a plot for an unsuccessful example of response staging of standpipe pressure (SPPA). The thin continuous line is the standpipe pressure channel (SPPA) starting from coming out of slips and continuing until a certain amount of footage of drilling.

Figure 11:
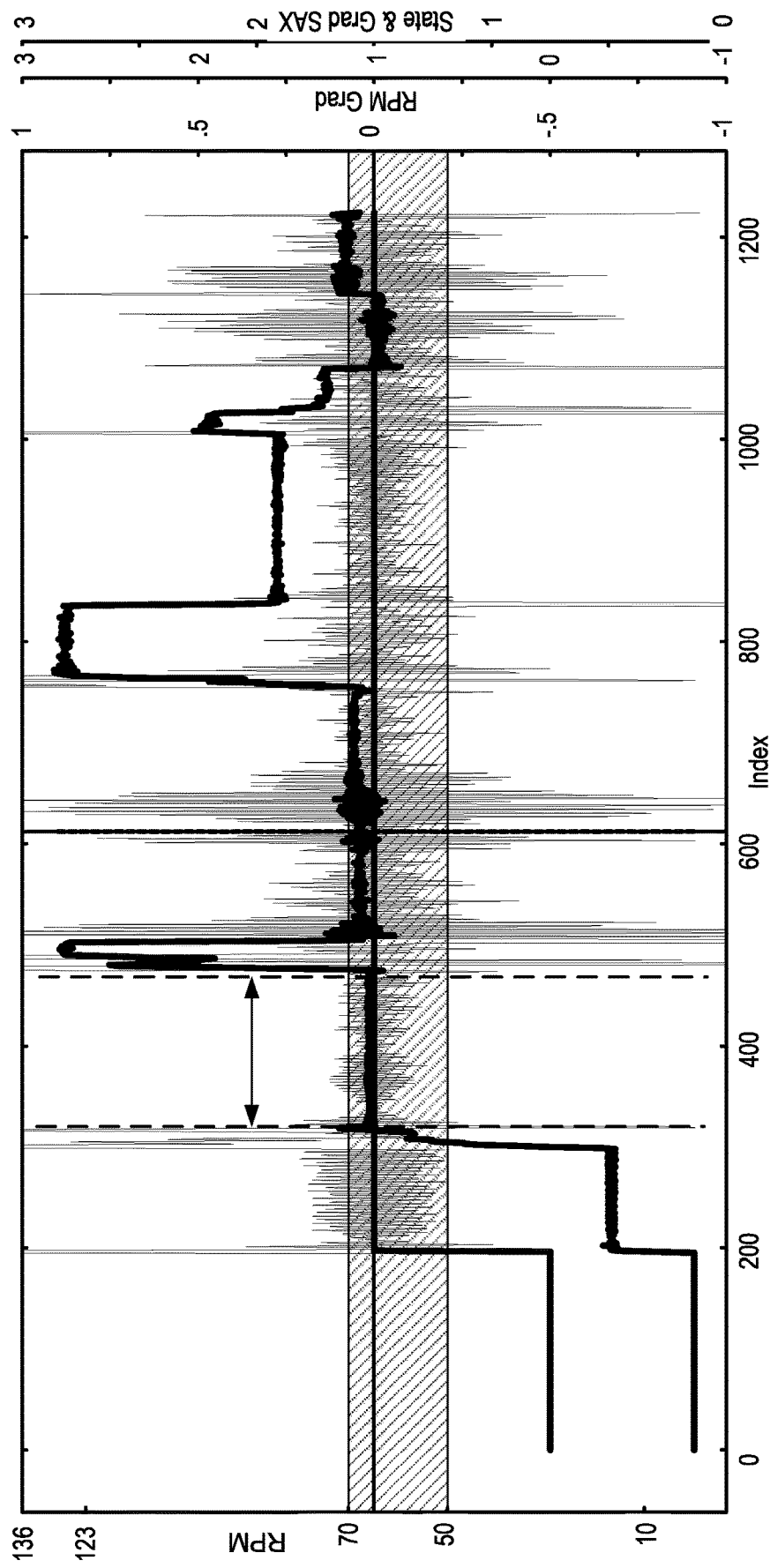
FIG. 11 illustrates an example of a graphical user interface.

FIG. 11 shows an example GUI 1100 that includes a plot for a successful example of actuator stating (surface rotation rate, RPM). The SOP is about staging the rotation before reaching the drilling rotation rate. The continuous line is the channel of rotation rate starting from coming out of slips and continuing until a certain amount of footage of drilling is accomplished. The high frequency line at is the gradient of the actuator channel. The shaded area that extends across the X axis represents a user's input on staging level to be analyzed (SOP). The area between the dashed lines that extend vertically across the Y axis shows the detected staging.

Figure 12:
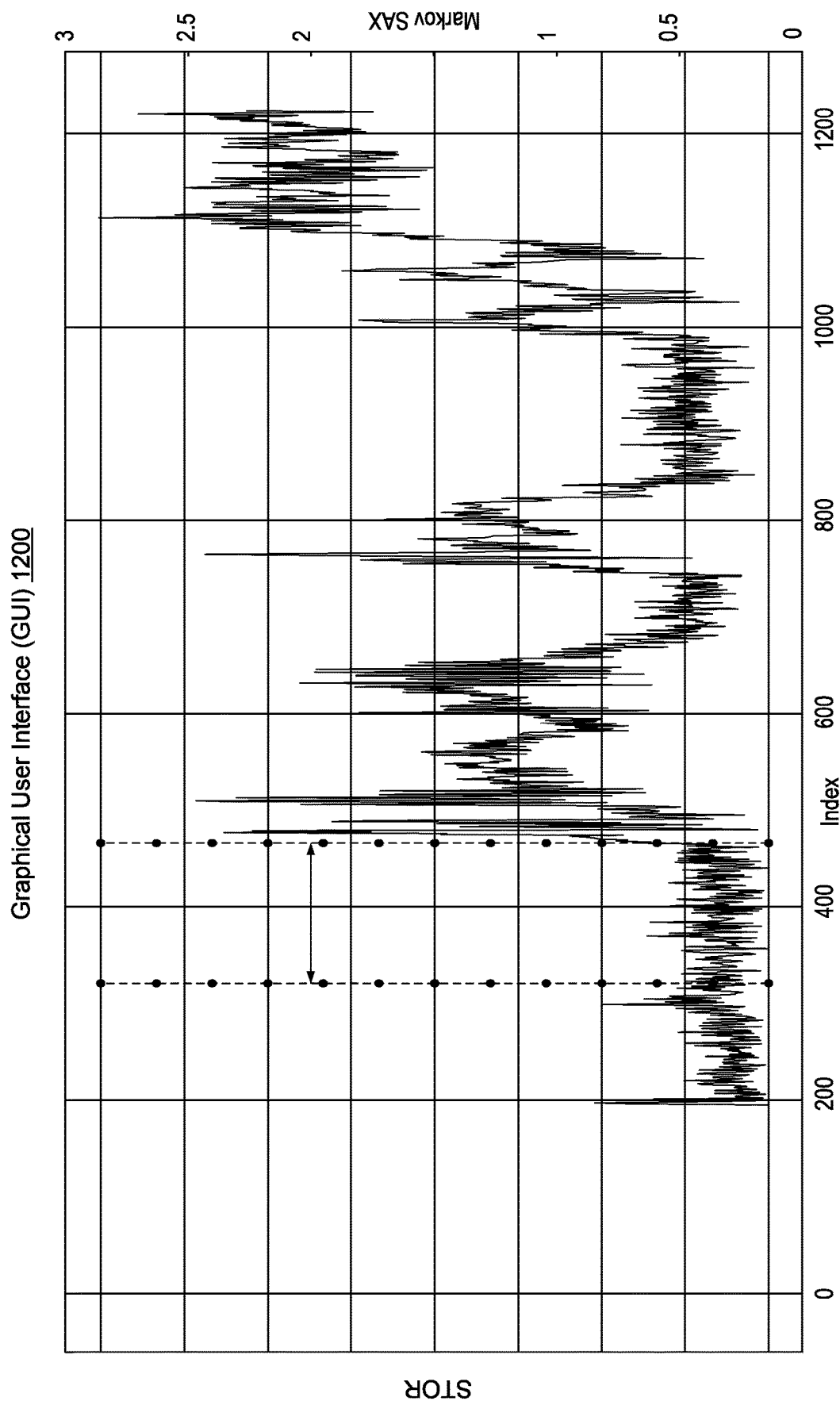
FIG. 12 illustrates an example of a graphical user interface.

FIG. 12 shows an example GUI 1200 that includes a plot for a successful example of response staging of surface torque (STOR) together with a staged actuator of rotation rate as shown in the previous GUI 1100 of FIG. 11. The continuous line is the torque channel (STOR) starting from coming out of slips and continuing until a certain amount of footage of drilling. Dashed and dotted lines are the staging interval that is the overlapped interval between torque and rotation rate.

Figure 13:
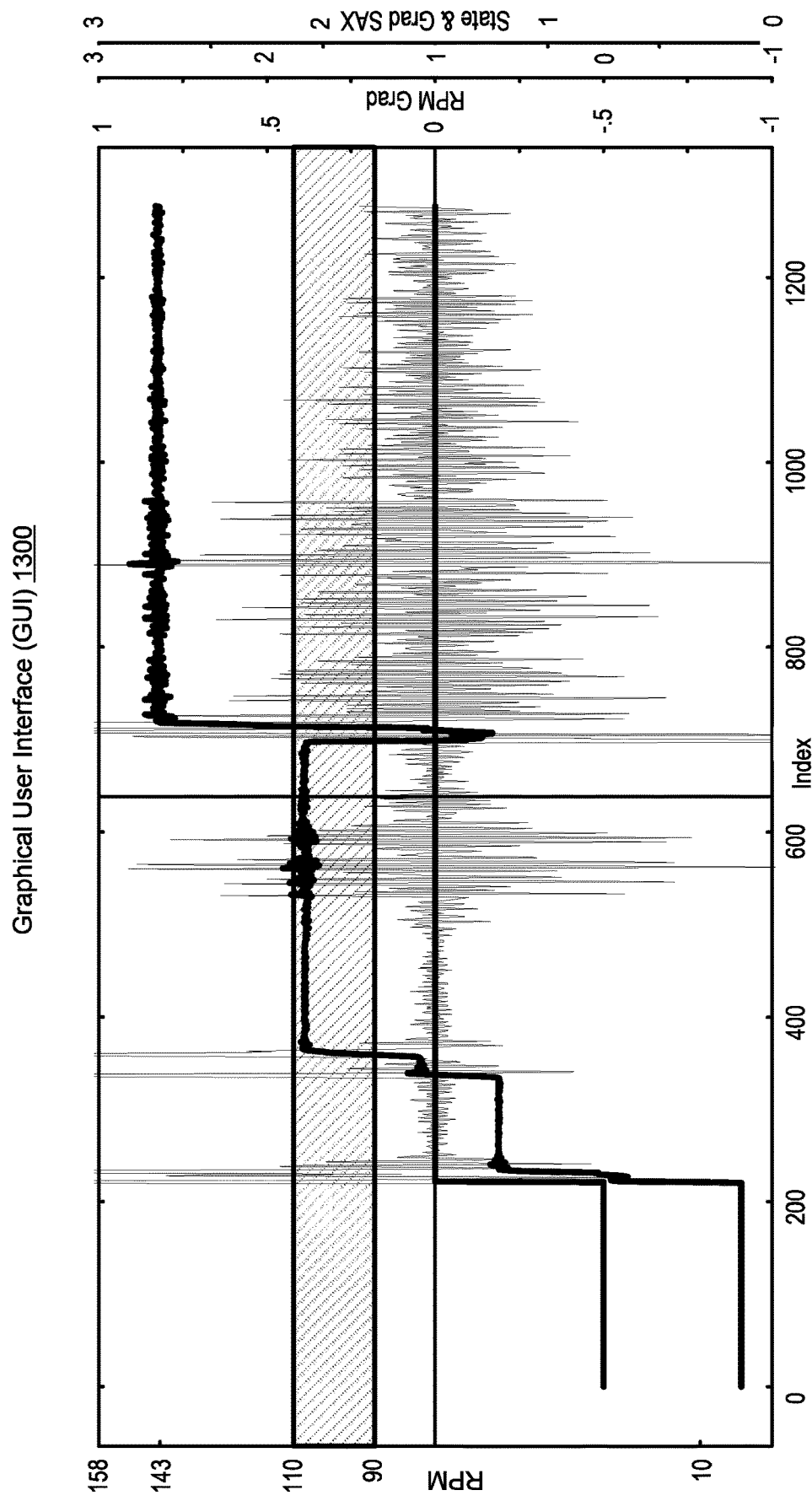
FIG. 13 illustrates an example of a graphical user interface.

FIG. 13 shows an example GUI 1300 that includes a plot for an unsuccessful example of staging (surface rotation rate, RPM). While the RPM is inside the boundary defined by a SOP (see, e.g., shaded region between RPM values of 90 and 110, which may be automatically populated, presented in a GUI as associated with the SOP, selectable by a user, etc.), the torque (STOR) is not staged, therefore the event is not staged (see FIG. 14). The continuous line is the channel of rotation rate (RPM) starting from coming out of slips and continuing until a certain amount of footage of drilling is accomplished. The high frequency line is the gradient of the actuator channel. A mentioned, the shaded area that extends across the X axis can represent a user's input on staging level to be analyzed (e.g., SOP analysis), which may optionally be populated automatically through access to SOP data, or otherwise rendered to guide a user's input, etc. As an example, a user can input one or more limits and/or one or more limits can be input automatically that can be utilized in analyzing SOP compliance and/or control.

Figure 14:
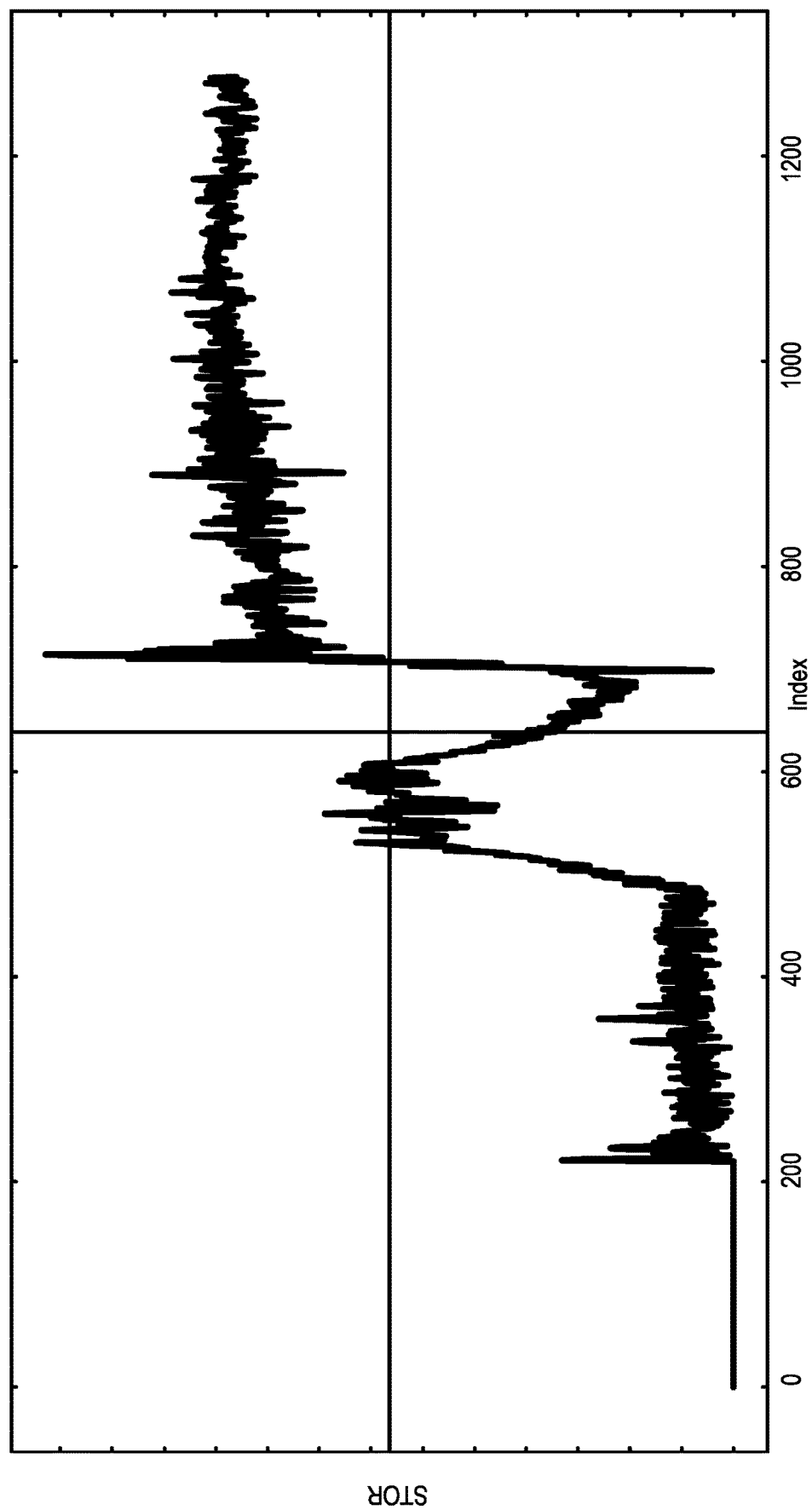
FIG. 14 illustrates an example of a graphical user interface.

FIG. 14 shows an example GUI 1400 that includes a plot for an unsuccessful example of response staging of surface torque (STOR). The continuous line is the torque channel (STOR) starting from coming out of slips and continuing until a certain amount of footage of drilling.

Figure 15:
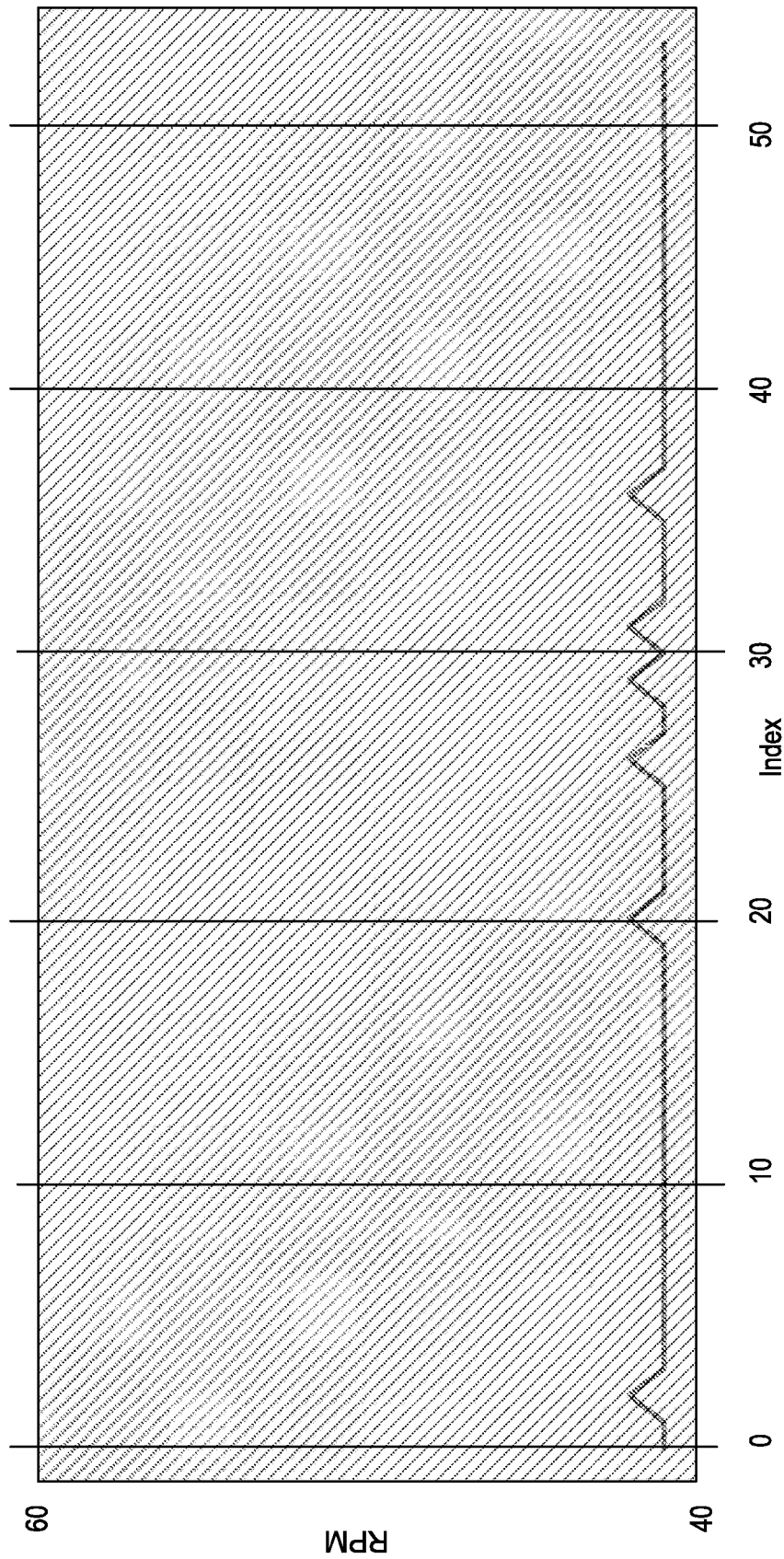
FIG. 15 illustrates an example of a graphical user interface.

FIG. 15 shows an example GUI 1500 that includes a plot for a successful example of drilling parameters inside bounds (see, e.g., limits of 40 RPM to 60 RPM). The continuous line is the channel of rotation rate (RPM). The SOP is about keeping the rotation rate (RPM) within the bounds (e.g., 40 RPM to 60 RPM in this example) during on bottom rotary drilling. As shown, bounds (e.g., limits) may be utilized to render indicia to a display (e.g., a GUI), for example, to represent a user's input on the bounds that RPM is to stay within (e.g., per a SOP).

Figure 16:
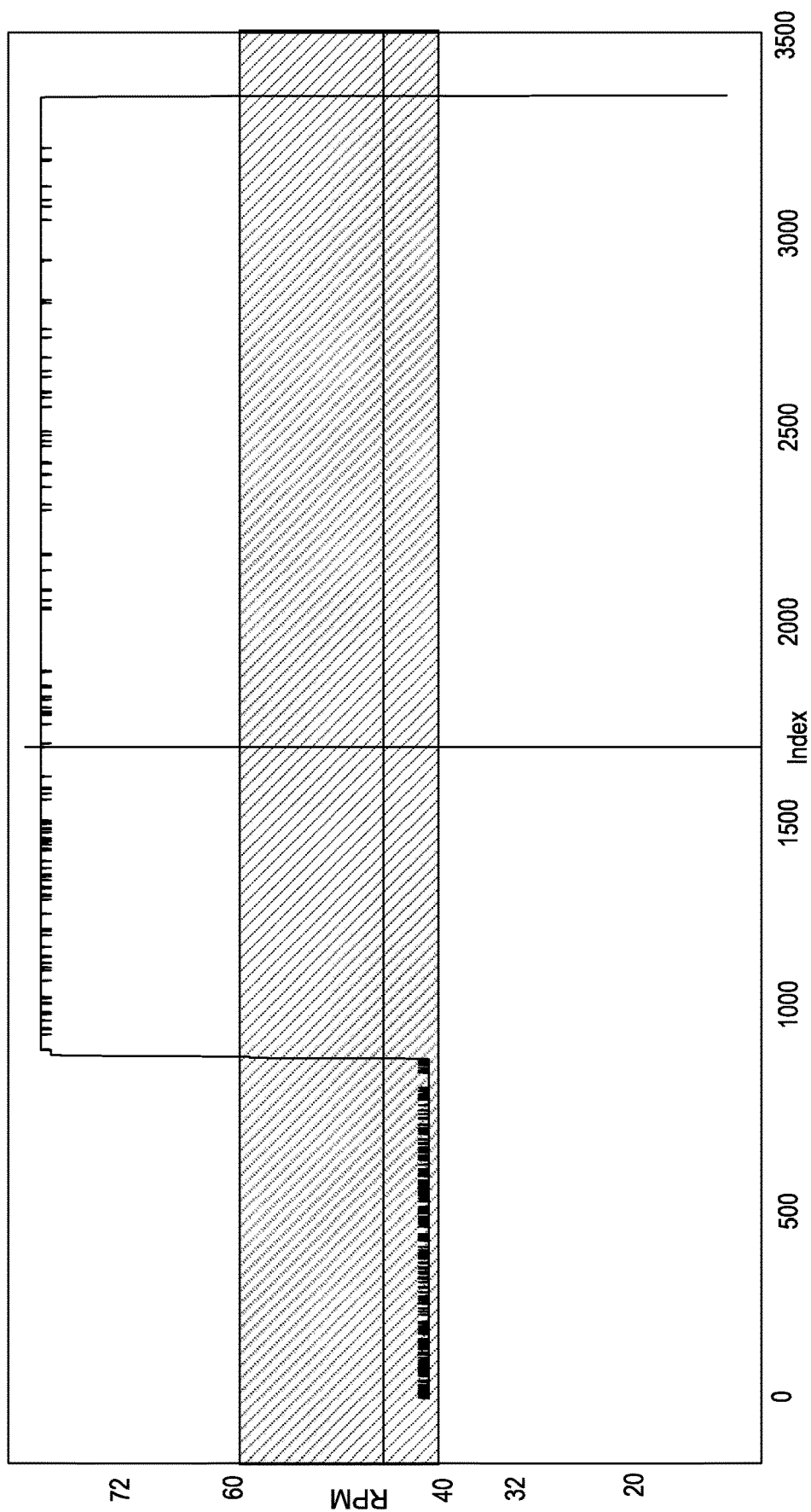
FIG. 16 illustrates an example of a graphical user interface.

FIG. 16 shows an example GUI 1600 that includes a plot for an unsuccessful example of drilling parameters inside bounds. In the example of FIG. 16, the RPM values go outside the upper bound of 60 RPM at approximately 900 on the index (e.g., data sample index, etc.). The continuous line in the GUI 1600 is the channel of rotation rate (RPM). The SOP is about keeping the rotation rate within the bounds (40-60 RPM in this example) during on bottom rotary drilling.

Figure 17:
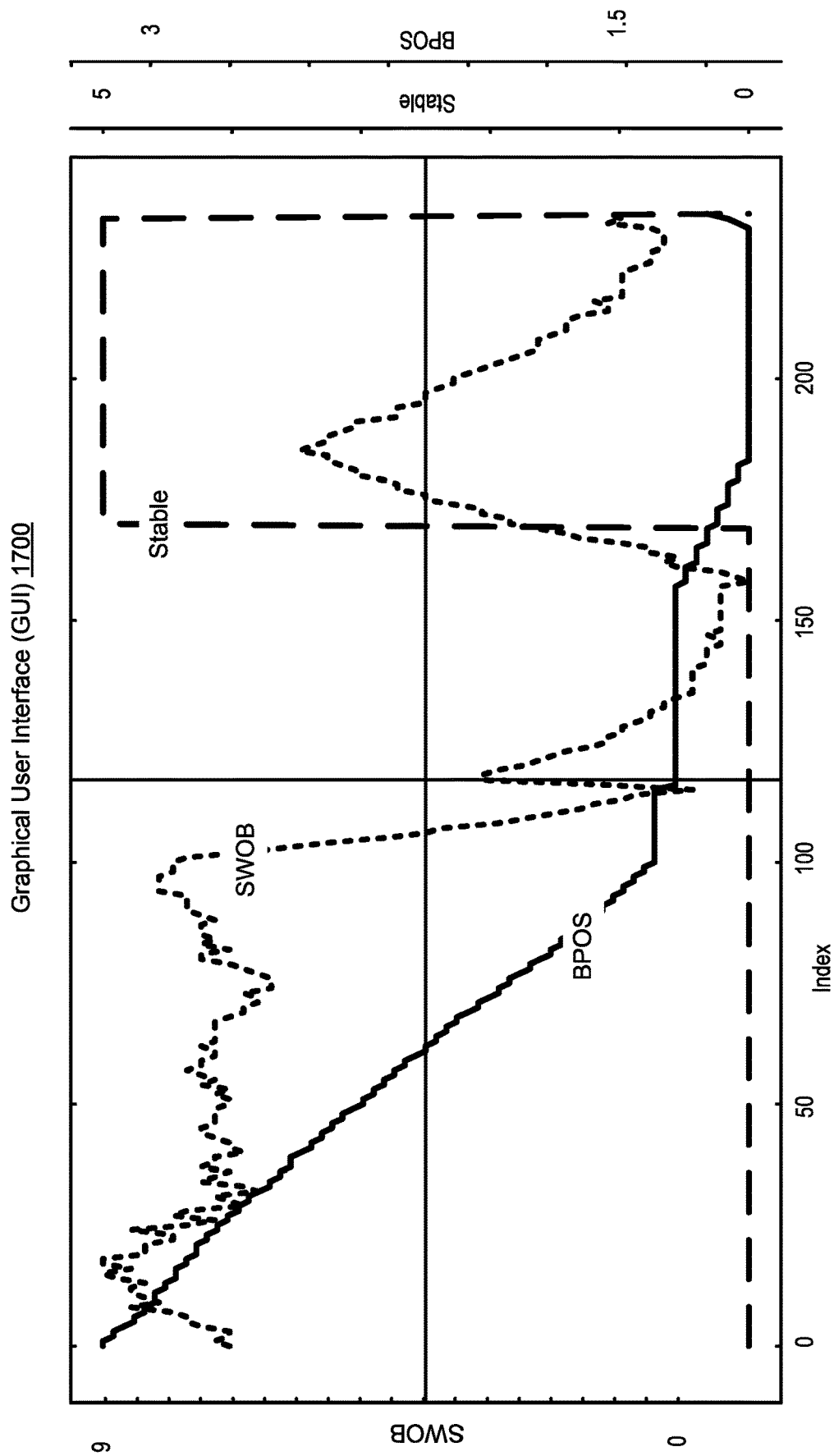
FIG. 17 illustrates an example of a graphical user interface.

FIG. 17 shows an example GUI 1700 that includes a plot for a successful example of drilling off. SWOB is drilled off from around 5 klbs to around 0.5 klbs, which satisfied a user's success criteria. The continuous line is block position channel (BPOS). The dotted line is the surface weight on bit channel (SWOB). The SOP is concerned with stopping the block at the end of the stand (BPOS) and waiting for weight on bit (WOB) to decrease to a user defined value over the time.

Figure 18:
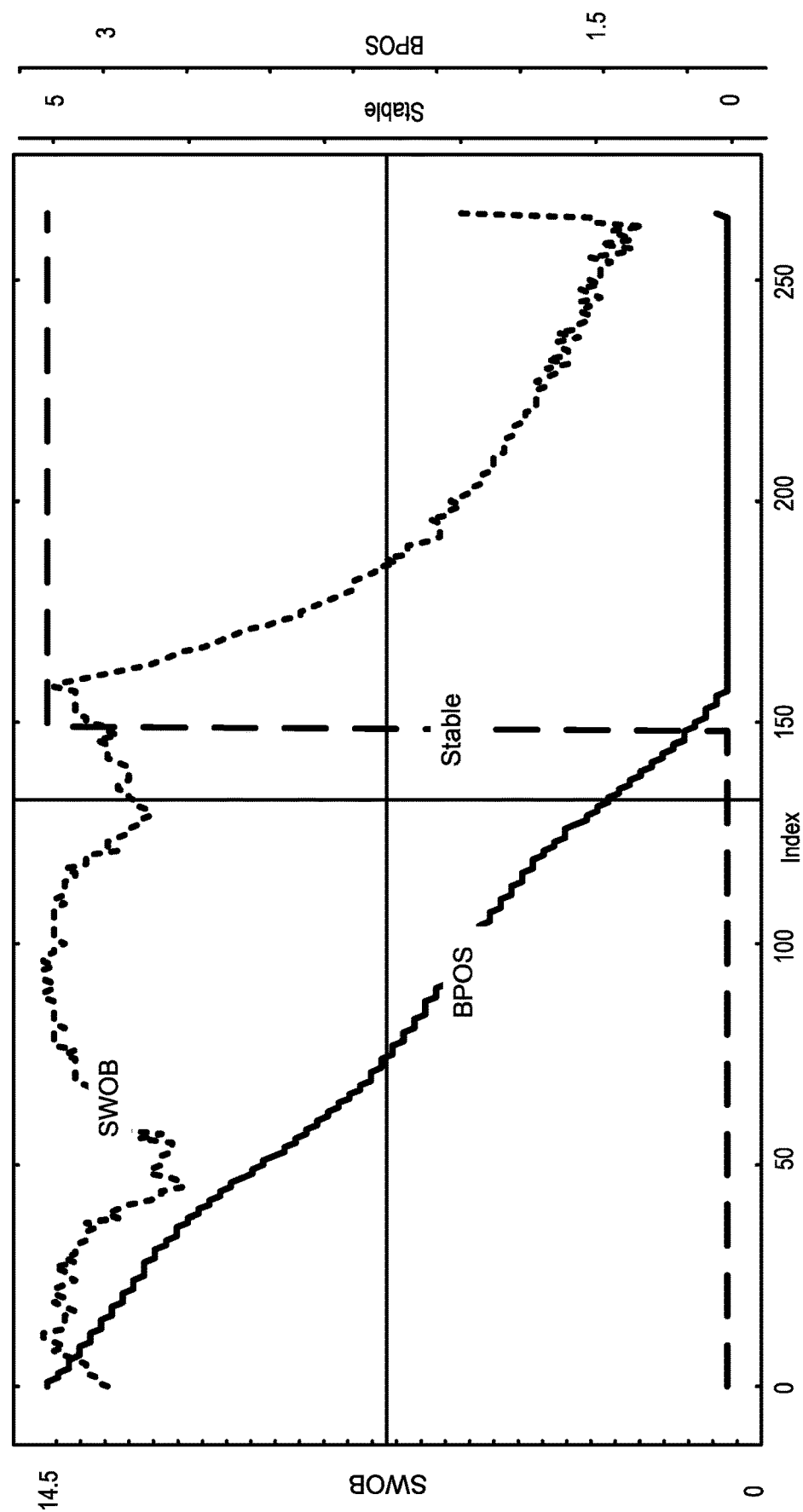
FIG. 18 illustrates an example of a graphical user interface.

FIG. 18 shows an example GUI 1800 that includes a plot for an unsuccessful example of drilling off. SWOB is drilled off from around 14 klbs to around 3 klbs, which did not satisfy a user's success criteria. The continuous line is block position channel (BPOS). The dotted line is the surface weight on bit channel (SWOB). The SOP is stopping the block at the end of the stand (BPOS) and waiting for weight on bit (WOB) to decrease to a user defined value over the time.

In comparing FIG. 17 and FIG. 18, the plots show on the Y axis, SWOB drops from around 4 to 6 klbs to around 1 klbs in the plot of FIG. 17 while in the plot of FIG. 18, there is still around 3 klbs weight left, which did not satisfy one of a user's success criterion.

Referring again to the method 600 of FIG. 6, as mentioned, data partitioning and a query processor can be utilized to evaluate procedural compliance as to field operations based on acquired data. Such a method may operate in real time and transmit feedback, which may be utilized for control of one or more operations.

SOPs can be defined to be source agnostic as in standard operating procedures can be a part of the drilling program or for example can be part of a driller's instructions. As mentioned, a system may be used in real time as a part of control loop to monitor and advice operations (e.g., manual, automated, semi-automated, etc.) or as part of post job analysis to understand the performance.

A system can be used for example by a drilling engineer post-operation to understand how compliant the operation is commenced considering the SOPs which were designed as part of drilling program or driller's instructions.

Additionally, SOPs can be analyzed with a system in real time or near real time (e.g., considering transmission delays, particularly for downhole sensors which may transmit information via mud-pulse telemetry, etc.).

As an example, a workflow can include a driller exceeding a WOB operating parameter during drilling or a tripping speed operating parameter during tripping in or out. Such violations can be detected in real time via use of partitioning and queries. For instance, where a WOB limit is exceeded, in response, a system can take control to get back into a safe window of a standard operating procedure (e.g., decrease WOB) or, for example, a user can be warned in real time (e.g., a notification can be issued to a driller). In the context of tripping, similar control and/or notification can be given for tripping speed where an aim is to keep it within bounds. As an example, control of a drawworks can be established to stay within the limits of a standard operating window (e.g., as specified) and/or a user can be guided and warned whenever it is exceeded.

Where operations are being carried out and compliance of the operations to standard operating procedures are monitored (e.g., and adjusted as appropriate), a consistent and optimized drilling operation can be accomplished.

As mentioned, algorithms that can be utilized include SAX, hidden Markov modeling, recursion algorithms, Viterbi algorithm(s), Baum-Welch algorithms, heuristics and physics boundary conditions relevant to drilling, etc.

As to SAX, it can reduce dimensionality of data. For example, SAX can convert continuous time series signals into a stream of letters (e.g., or other monikers) based on parameter limits available in an operating procedure. In the letter approach, these letters help in creating an abstract representation of the procedure and can be processed by the system to understand the compliance to the SOP.

As an example, a probabilistic Markov model can be utilized for modeling of drilling operations. As an example, a hidden Markov model can be used to model a sequence of symbols which represents a standard operating procedure. In such an example, a temporal sequence of symbols from processed SAX can be processed using pre-defined Markov chains whose internal state(s) define the likelihood of a sequence of symbols if an operating procedure is followed as expected. In such an example, the hidden Markov models can help in generalizing operating procedures as they are probabilistic and can accept marginal variations as each instance of the operation may be different.

Figure 19:
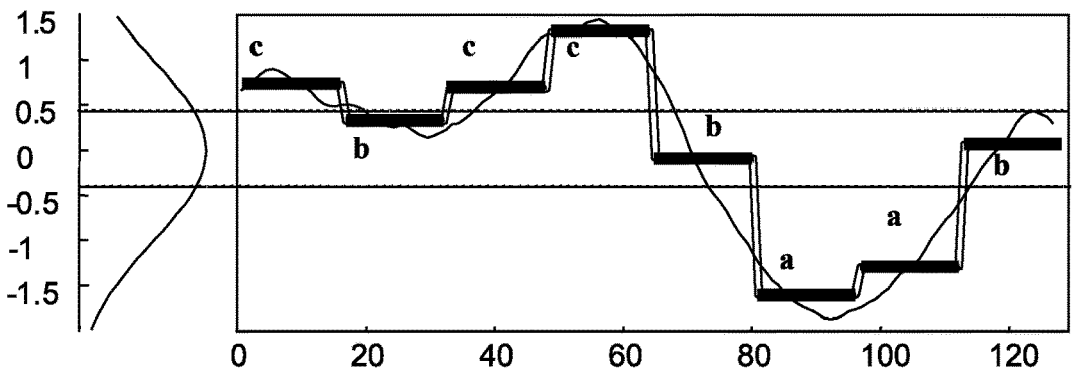
FIG. 19 illustrates an example of an equation, an example of a table, an example of a plot, an example of a symbolic representation and an example of a probabilistic chain model.
Figure 19:
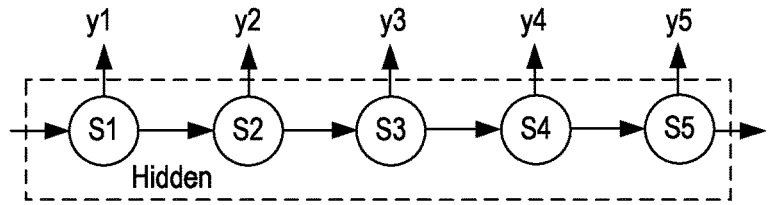

FIG. 19 shows an example of an equation 1910, an example of a table 1930, an example of a plot 1950 and an example of a representation of data 1970 as in the plot 1950 along with an example diagram of a hidden Markov model (HMM) 1990. The equation 1910, the table 1930, the plot 1950 and the representation 1970 are associated with a technique referred to as symbolic aggregation approximation (SAX).

As to the equation 1910, a time series (' of length n can be represented in a w-dimensional space by a vector (where the i-th element of the vector $\bar{7}$ can be calculated via the equation 1910. Such an approach can be used to transform a time series from n dimensions to w-dimensions, for example, where data are divided into w equal sized "frames." The mean value of data falling within a frame can be calculated and a vector of these values becomes the dimensionality reduced representation. Such a representation is known as Piecewise Aggregate Approximation (PAA).

Having transformed a time series into the PAA representation, a transformation can be applied to obtain a discrete representation. As an example, a discretization technique may be utilized that can produce symbols with equiprobability. As an example, normalized subsequences may exhibit a Gaussian distribution such that a system can determine "breakpoints" that produce equal-sized areas under a Gaussian curve.

Breakpoints can be a sorted list of numbers $B=\beta_1, \ldots, \beta_{a-1}$ such that the area under a N(0,1) Gaussian curve from $\beta_i$ to $\beta_{i+1}=1/a$ (e.g., where $\beta_0$ and $\beta_a$ are defined as $-\infty$ and $\infty$, respectively). As an example, these breakpoints may be determined by looking them up in a statistical table. For example, the table 1930 of FIG. 19 gives the breakpoints for values from 3 to 5. Such a lookup table includes the breakpoints that divide a Gaussian distribution in an arbitrary number (e.g., from approximately 3 to approximately 5) of equiprobable regions.

As an example, once breakpoints have been obtained, it is possible to discretize a time series in the following manner. First, obtain a PAA of the time series. In such an example, PAA coefficients that are below the smallest breakpoint can be mapped to the symbol "a"; whereas, coefficients greater than or equal to the smallest breakpoint and less than the second smallest breakpoint can be mapped to the symbol "b", etc.

In the plot 1950, a time series (thin black line) is discretized by first obtaining a PAA approximation and then using predetermined breakpoints to map the PAA coefficients into symbols (bold letters). In the example data of the plot 1950, with n=128, w=8 and a=3, the time series is mapped to the word "cbccbaab", which is shown as a representation 1970. Note that in this example, the 3 symbols, "a", "b" and "c" are approximately equiprobable as desired. The concatenation of symbols that represent a subsequence can be referred to as a word (see the representation 1970).

Referring again to FIG. 19, the plot 1950 represents a transformation of data that can be acquired via equipment where such a transformation may be part of a workflow, optionally a real time workflow where decisions are made, instructions issued (e.g., via one or more network interfaces), etc. to control one or more pieces of equipment. As an example, a framework can include receiving data and transforming data to generate transformed data where the transformed data is amenable to analysis by one or more algorithms that can expedite decision making, issuance of instructions, etc.

As to the HMM 1990, states S1, S2, S3, S4 and S5 are shown along with possible observations y1, y2, y3, y4 and y5. The HMM 1990 can include state transition probabilities (e.g., a12, a23, etc.) and output probabilities (e.g., b11, b22, etc.). A hidden Markov model can be used to model a sequence of symbols which represents a standard operating procedure. For example, a temporal sequence of symbols from processed via SAX can be processed using pre-defined Markov chains whose internal states define the likelihood of a sequence of symbols if an operating procedure is followed as expected. Hidden Markov models help in generalizing operating procedures as they are probabilistic and can accept marginal variations as each instance of the operation may be different.

A HMM can include a set of states where the HMM can model a process that moves from one state to another to thereby generate a sequence of states. As to the Markov chain property, the probability of each subsequent stat depends on what was the previous state. A HMM can be defined via probabilities, which can include state transition probabilities (e.g., a matrix as to hidden state transitions) and initial probabilities (e.g., a vector) as well as observation probabilities (e.g., a matrix as to visible states). In such an approach, each state can generate one of a number of observations (e.g., visible states). A HMM can be utilized to determine the probability of a sequence of states. As mentioned, such states may be represented using symbols such as via a SAX approach. A HMM may be applied for one or more purposes. In an evaluation approach, given a HMM and an observed sequence of observations, it is possible to determine the probability that the HMM has generated the sequence. In a decoding approach, given a HMM and an observed sequence of observations, it is possible to determine the most likely sequence of hidden states that produced the observed sequence. In a learning approach, given training observation sequences and a general HMM structure, parameters of an HMM may be determined (e.g., matrixes of probabilities and vector of initial probabilities). A HMM approach may implement a forward-backward recursion algorithm(s), a Viterbi algorithm(s), a Baum-Welch algorithm(s), etc.

As an example, data from one or more channels can be processed to reduce the data to symbols, which can be symbolic observations that define an observed sequence. Such an observed sequence can be utilized with a HMM to determine the most likely sequence of hidden states that produced the observed sequence.

As an example, data from one or more channels can be processed to reduce the data to symbols, which can be symbolic observations that define an observed sequence. Such an observed sequence can be utilized with a HMM to determine the probability that the HMM generated the observed sequence. As mentioned, a HMM can model a sequence of symbols that represents a SOP. As mentioned, a temporal sequence of symbols (e.g., via a SAX approach) can be processed using a pre-defined Markov chain whose internal state(s) defines the likelihood of a sequence of symbols if an operating procedure is followed as expected. Hidden Markov models can help in generalizing operating procedures such as SOPs as HMMs are probabilistic and can accept marginal variations as each instance of an operation may be different.

As mentioned, a system can use the concept of partitions to isolate sections in time series data (e.g., and/or depth series data) where specific SOPs are likely to be executed. Some examples of partitions that can be of interest include going on bottom, on bottom rotary drilling, and pulling out of hole. Such partitions can be automatically segmented from one or more data channels (e.g., of rigsite data, etc.) using a state-based approach where states can include, for example, rig states, slips states and/or drill states. As an example, partitions can be created in real time and/or on demand and can be used in downstream processing where operating procedures are modeled as queries and run on partitions to answer a question as to whether a specific operating procedure has been executed as prescribed.

As mentioned, a symbolic representation scheme may be utilized such as, for example, a modified Symbolic Aggregate approximation (SAX) scheme. As an example, modeling of field operations can be addressed using a probabilistic Markov model. As an example, partitioned time-series data can be processed through symbolic representations where a method can include use of an SOP and, for example, a driller's instructions' operational limit(s) (e.g., user input, etc.) to create a dimensionally reduced sequence of symbols. As mentioned, a hidden Markov model(s) can be utilized to encode industry heuristics and process symbolic representations to search for patterns that can indicate if the observed operations are in accordance with an SOP and, for example, a driller's instructions' operational limit(s).

As an example, a method can be utilized to automatically identify degree of adherence to one or more standard operating procedures (SOPs) during drilling operations. Various SOPs can define sequences of operations, with associated input parameter ranges and expected outcomes, to achieve execution goals. In various automation systems, there can be a missing link as it may not be possible to express and monitor SOPs as field operations are performed. Various example methods, systems, etc. described herein can be implemented to determine degree of compliance of drilling activities to one or more SOPs. As mentioned, a method may be implemented in real time and include controlling one or more operations, for example, by issuing one or more control signals based at least in part on a degree of compliance to an SOP determination.

As mentioned, a system can use partitions to isolate sections in time series data where specific SOPs are likely to be executed. Examples of partitions include going on bottom, on bottom rotary drilling, pulling out of hole, etc. These partitions can be automatically segmented from data using separately computed base states, which can include inferred equipment states for pumps, slips or top drive and activity states like rotary, slide drilling, tripping or circulate. Partitions can be created on demand and can be used in processing where operating procedures are modeled as queries and run on partitions to answer the question as to whether a SOP has been executed as prescribed.

In constructing queries for procedural adherence metrics, various example methods can include developing compact representations from sensor data, which may be or include noisy sensor data, and in modeling complex drilling operations to compare with these representations. As mentioned, as an example, a method can implement a modified Symbolic Aggregate approximation (SAX) technique. As mentioned, as an example, a method can include modeling of drilling operations using a probabilistic Markov model.

In various examples, partitioned time-series data is processed using SAX where information as to a SOP and, for example, a driller's instructions' operational limits can be utilized to create a dimensionally reduced sequence of symbols. As an example, Markov models can be used to encode industry heuristics, and processes the symbols searching for patterns which indicate if one or more observed operations are in accordance with one or more SOPs.

As an example, a method can be used to determine the degree of procedural adherence for one or more historical data sets. Whether historical and/or real time, data sets can include sensor data sets, drilling programs, and daily instructions to a driller (e.g., for one or more previously drilled wells and/or one or more wells being drilled). Queries can be constructed based on one or more SOPs in a driller's instructions, where data can be automatically partitioned into appropriate partitions (e.g., on bottom rotary and slide drilling partitions, etc.) where compact representations can be generated and queries executed on information such as, for example, flow rate (FLWI), rotation (RPM), weight on bit (SWOB) and rate of penetration (ROP) to evaluate the level of compliance to the procedures.

A system may be implemented to provide a robust automated way to analyze large datasets and extract information from drilling data to assess the degree of compliance to SOPs. Such metrics, as output by a system, can be a part of a scheme that improves overall well construction outcomes. For example, consider a control scheme as implemented by a controller (e.g., a control system) that is operatively coupled to one or more pieces of field equipment (e.g., via wire, wirelessly, etc.).

Figure 20:
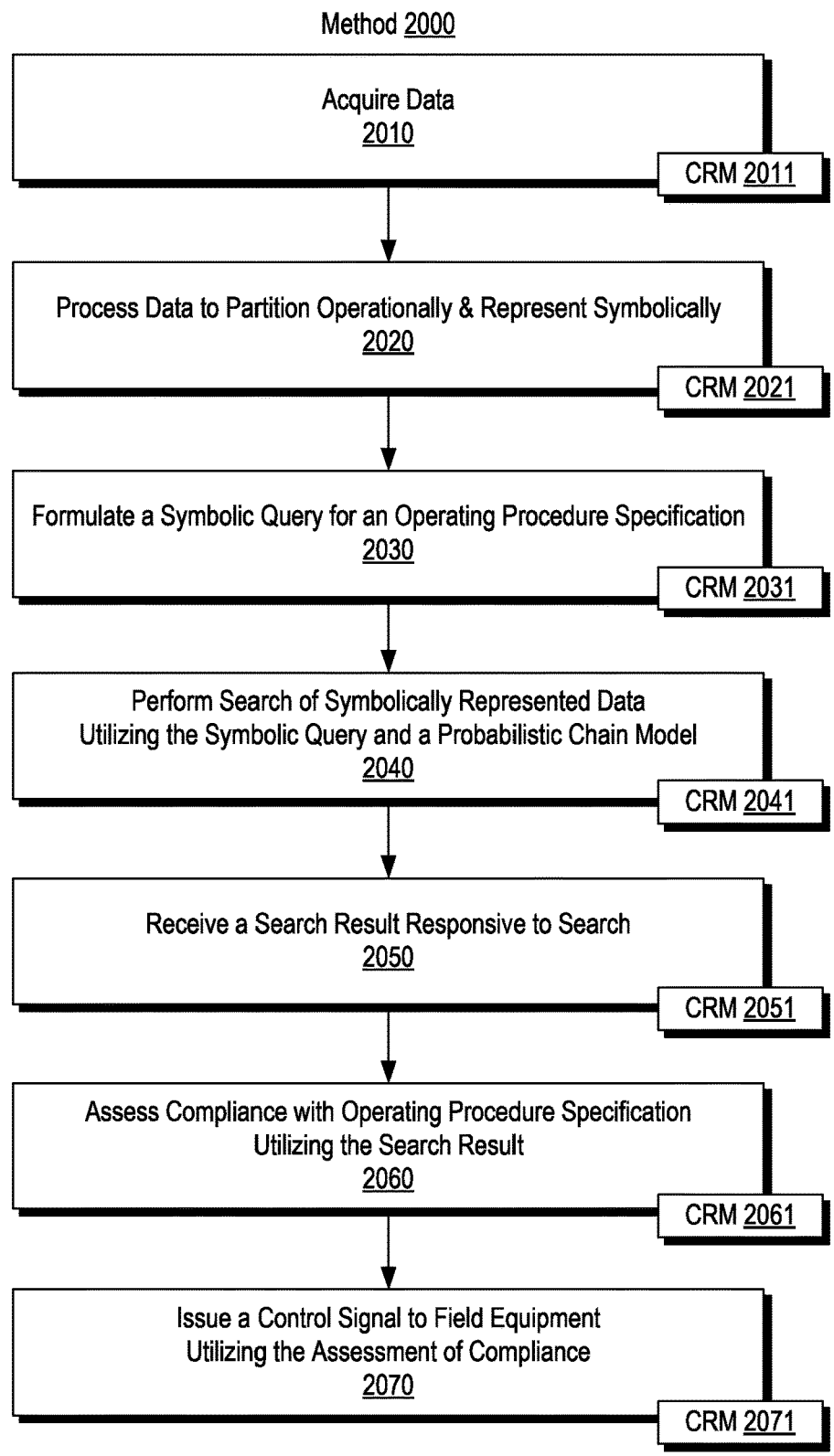
FIG. 20 illustrates an example of a method.

FIG. 20 shows an example of a method 2000 that includes an acquisition block 2010 for acquiring data associated with a field operation in a geologic environment; a process block 2020 for processing the data by partitioning operationally and representing symbolically; a formulation block 2030 for formulating a symbolic query for an operating procedure specification; a performance block 2040 for performing a search of the symbolically represented data utilizing the symbolic query and a probabilistic chain model; a reception block 2050 for receiving a search result responsive to the search; an assessment block 2060 for assessing compliance with the operation procedure specification utilizing the search result; and an issuance block 2070 for issuing a control signal to field equipment utilizing the assessment of compliance.

The method 2000 is shown as including various computer-readable storage medium (CRM) blocks 2011, 2021, 2031, 2041, 2051, 2061 and 2071 that can include processor-executable instructions that can instruct a computing system, which can be a control system, to perform one or more of the actions described with respect to the method 2000.

In the example of FIG. 20, the method 2000 can include receiving one or more operational limits. In such an example, the symbolic query may be formulated based at least in part on one or more of the received operational limits. Various examples of limits appear in various example GUIs (see, e.g., hatched regions with upper and lower limits in various plots).

FIG. 21 shows an example of a system 2100 that includes a field equipment interface 2110 that is operatively coupled to one or more pieces of field equipment, a symbolic representation scheme processor 2120, a hidden Markov model processor 2130, an algorithmic processor 2140, an operating procedure specifications database 2150 and a graphical user interface processor 2160. The system 2100 can include one or more processors, which can be a single processor that can be programmed to execute in a particular manner or can be a group of processors that can be programmed to execute in one or more particular manners. For example, a processor can be, at times, the symbolic representation scheme processor or the hidden Markov model processor. As an example, the GUI processor 2160 can be a graphics processor such as a graphical processing unit (GPU) or GPUs.

The system 2100 can be a control system where data can be acquired via the field equipment interface 2110 and where one or more control signals can be transmitted via the field equipment interface 2110.

As an example, the system 2100 can be a specialized computing system that improves control of one or more field operations. The system 2100 can be utilized to perform one or more methods such as, for example, the method 600 of FIG. 6 or the method 2000 of FIG. 20. Various examples of GUIs may be rendered by the system 2100 to one or more displays. For example, the GUI processor 2160 can include instructions or can access instructions for rendering of one or more of the GUIs of FIGS. 7 to 18, FIG. 22 and FIG. 23. Interactions with a GUI, for example, via an input mechanism (e.g., touchscreen, voice, mouse, trackball, stylus, etc.), can instruct the system 2100 to perform one or more actions, for example, as explained with respect to the GUIs of FIGS. 7 to 18, FIG. 22 and FIG. 23.

Figure 22:
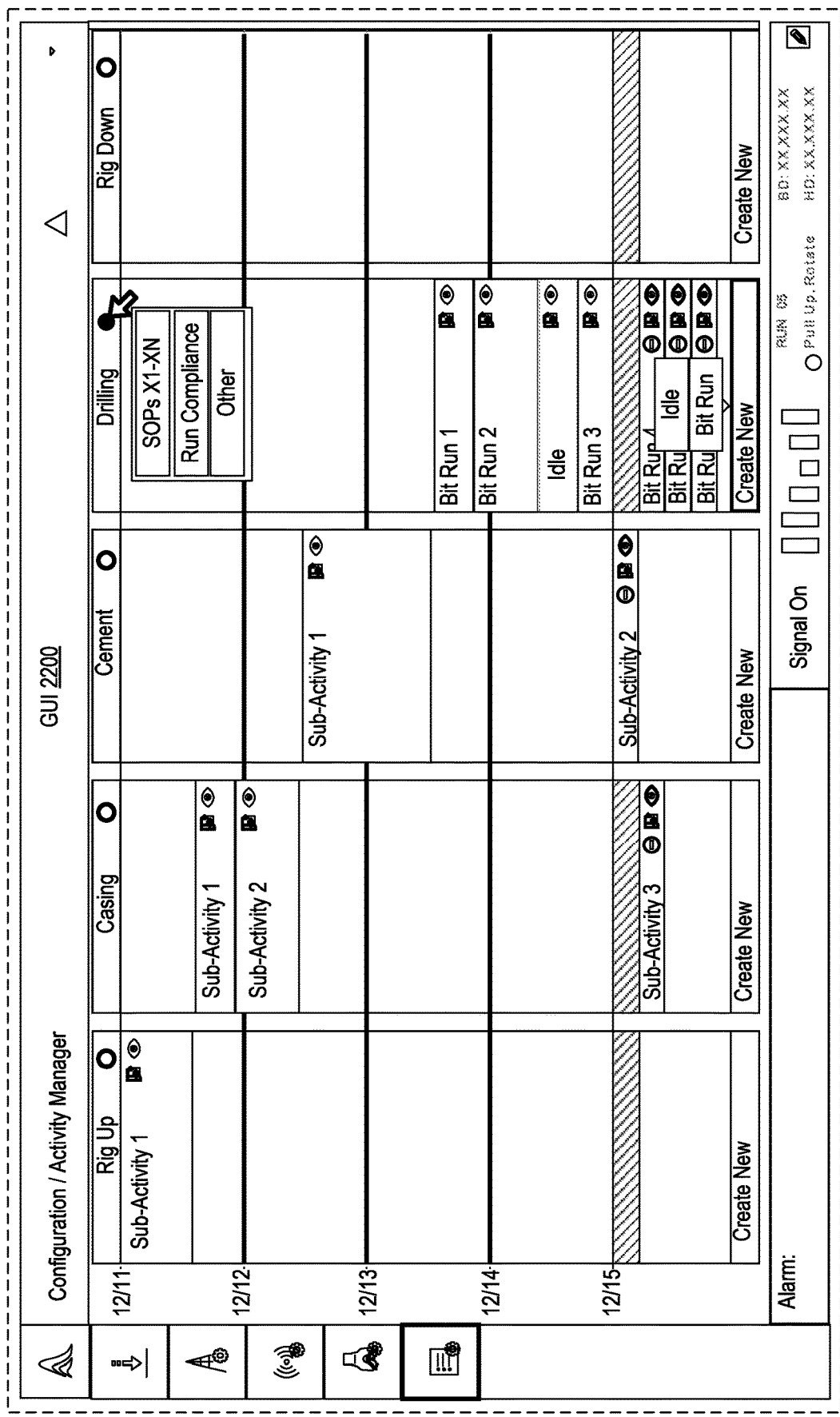
FIG. 22 illustrates an example of a graphical user interface.

FIG. 22 shows an example of a graphical user interface (GUI) 2200 that includes various subsystem tasks as may be part of a well plan. For example, a rig up subsystem, a casing subsystem, a cement subsystem, a drilling subsystem and a rig down subsystem are illustrated as some possible examples of subsystems that can include associated tasks. As shown in the example of FIG. 22, the GUI 2200 includes a timeline, which can be incremented by minute, hour, day, etc. In the example of FIG. 22, the GUI 2200 can be render information as to scheduled tasks that are organized by subsystem type where a scheduled task may aim to achieve a desired state of wellsite equipment.

In the example of FIG. 22, the various tasks are shown as Sub-Activities and as other types of tasks (e.g., Idle, Bit Run, etc.), which may be considered to be Sub-Activities. As an example, graphical controls can allow for addition of one or more new activities (e.g., scheduling of new tasks). As an example, graphical controls can allow for rescheduling one or more tasks.

As an example, the GUI 2200 can include control graphics for options analyses as to implementation options as to one or more tasks. For example, a user may touch a touchscreen display as to the Sub-Activity 2 graphic under the Casing subsystem heading and call for selection of an implementation option.

In the example of FIG. 22, the GUI 2200 includes various graphical controls that can be associated with various operations to perform one or more methods associated with one or more SOPs. For example, a graphical control associated with drilling operations is selected as indicated by a solid black circle where a menu of selectable items is rendered to the display. As shown, the menu items can include SOPs X1-XN, run compliance and other. In such an example, the SOPs X1-XN item may be selected to cause rendering of information as to one or more SOPs, which may be defined as X1 to XN where one or more of the SOPs may be selected. The run compliance item may be selected to run a compliance evaluation on one or more of the SOPs X1 to XN, for example, as explained with respect to the method 600 of FIG. 6 or the method 2000 of FIG. 20. Such a run may implement a system such as the system 2100 of FIG. 21. As an example, an option can exist for continuous compliance monitoring, optionally with control.

In the example of FIG. 22, a dashed box represents a display device onto which the GUI 2200 can be rendered. For example, consider a flat panel display, which may be, for example, a touchscreen display.

Figure 23:
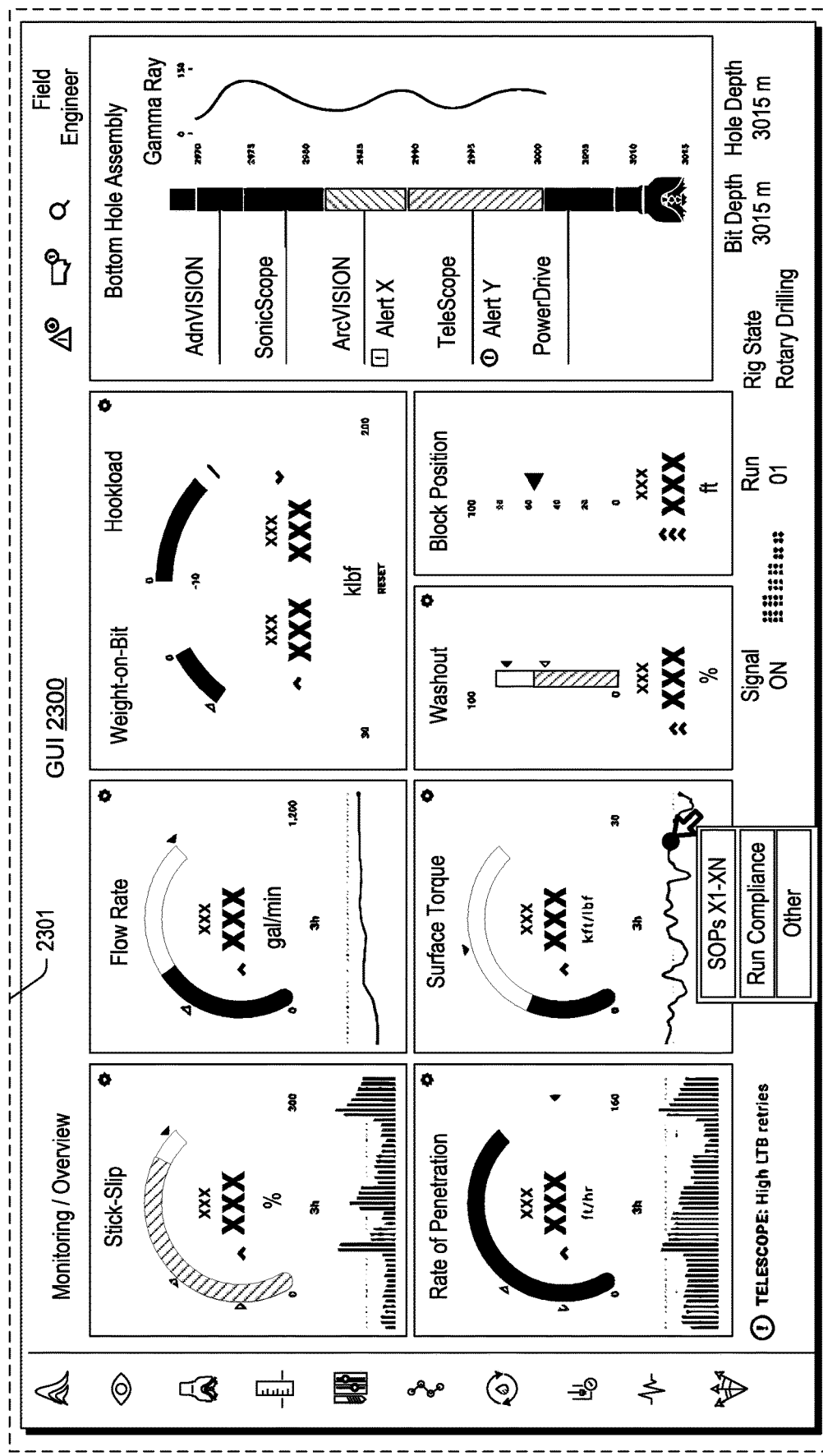
FIG. 23 illustrates an example of a graphical user interface.

FIG. 23 shows an example of a GUI 2300 that is rendered to a display device 2301, represented by a dashed box. For example, consider a flat panel display, which may be, for example, a touchscreen display.

In the example of FIG. 23, the GUI 2300 may be an operational dashboard where the state of one or more pieces of equipment, operations, etc. may be rendered visually, for example, via graphics and/or numbers. As an example, various colors may be utilized to convey state information. As an example, audio may be associated with the GUI 2300 and changes thereto, etc. For example, where a parameter reaches a limit, a color change may occur to a graphic of the display device 2301 and an audio alarm may be rendered via one or more speakers.

In the example of FIG. 23, the GUI 2300 can include various graphical controls that can be associated with various operations to perform one or more methods associated with one or more SOPs. For example, a graphical control associated with one or more plots of data such as the surface torque data may be selectable, as shown in FIG. 23. For example, a user may select a position on a plot such as the plot of surface torque versus time to cause the GUI 2300 to render a menu to the display. As shown, the menu items can include SOPs X1-XN, run compliance and other. In such an example, the SOPs X1-XN item may be selected to cause rendering of information as to one or more SOPs, which may be defined as X1 to XN where one or more of the SOPs may be selected. The run compliance item may be selected to run a compliance evaluation on one or more of the SOPs X1 to XN, for example, as explained with respect to the method 600 of FIG. 6 or the method 2000 of FIG. 20. Such a run may implement a system such as the system 2100 of FIG. 21. As an example, an option can exist for continuous compliance monitoring, optionally with control. In the example of FIG. 23, a user may select a particular point or region on a plot of data where the user may desire information about compliance. For example, where a plot appears to include data that may indicate a lack of compliance, a user may investigate further by selecting such data as rendered in the form of the plot where a method may execute responsive to such selecting and/or selecting of a menu item. Alternatively, a method may execute in a background mode where a selection via a graphical control causes rendering of information generated by the method as to compliance with one or more SOPs for a particular time or times, which can correspond to a time or times of one or more of the plots of data shown in the GUI 2300 of FIG. 23.

As an example, a method can include storing to store one or more represented field operations to one or more databases. In such an example, a represented state can be a letter that is stored to the database using a coding scheme. For example, consider an ASCII coding scheme.

As an example, a method can include acquiring data associated with a field operation in a geologic environment; processing the data by partitioning operationally and representing symbolically; formulating a symbolic query for an operating procedure specification; performing a search of the symbolically represented data utilizing the symbolic query and a probabilistic chain model; receiving a search result responsive to the search; assessing compliance with the operation procedure specification utilizing the search result; and issuing a control signal to field equipment utilizing the assessment of compliance. In such an example, representing symbolically can include utilizing a symbolic aggregation approximation (SAX) scheme. For example, consider a SAX scheme that includes letters as symbols.

As an example, a method can include receiving one or more operational limits and formulating a symbolic query based at least in part thereon. In such an example, the one or more operational limits can be for a standard operating procedure (e.g., as part of a method that aims to assess compliance therewith during performance of field operations such as drilling related operations). As an example, operational limits can include operational limits for one or more corresponding channels of data and/or other types of operational limits. For example, operational limits that can be operational procedure limits can be derived from experience, safety considerations, simulation results, etc.

As an example, operationally partitioning can involve partitioning areas of operational interest as to data for drilling related operations. Partitioning performed as to one or more operations (e.g., operationally partitioning) can involve partitioning as to one or more operations as evidenced in data (e.g., as to one or more drilling related operations). As an example, drilling related operations data from one or more channels, etc., can be partitioned by operation, by a combination of operations or by a portion of an operation.

As an example, a method can include performing a search utilizing a hidden Markov model as a probabilistic chain model. In such an example, performing the search can include utilizing one or more types of algorithms (e.g., forward recursion, backward recursion, Viterbi, etc.).

As an example, a hidden Markov model (HMM) can be used to model a sequence of symbols that represents a standard operating procedure (SOP). In such an example, a temporal sequence of symbols from SAX processing can be processed using pre-defined Markov chains whose internal state defines the likelihood of a sequence of symbols if an operating procedure is followed as expected. As an example, hidden Markov models can be implemented to help generalize standard operating procedures as they can be probabilistic and can accept marginal variations as each instance of an operation may be different. For example, for a field with a plurality of wells, a standard operating procedure may be complied with during drilling of two or more of the plurality of wells where data for each of the two or more wells differ to some extent, which may infer that some marginal variations occurred for different instances of operations. While the foregoing example refers to multiple wells, variations can occur for the same operation for a single well. As such, a HMM approach can provide flexibility to accommodate variations during operations for a single well and/or to accommodate variations during operations for a plurality of wells. As an example, one or more HMMs may be suitable for use for a plurality of different wells in a field (e.g., and optionally in different fields).

As an example, members of a probabilistic chain model can include corresponding symbolic representations.

As an example, a method can include receiving data that include time series data, which may include historic data and/or real time data. In such an example, a system may implement the method where the system includes one or more interfaces that can receive the data. As to control, the system may utilize one or more interfaces to issue one or more control signals (e.g., based at least in part on assessing compliance with an operation procedure specification).

As an example, a method can include rendering a graphical user interface to a display where the graphical user interface includes a plot with respect to time (e.g., via sample index, depth, etc.). In such an example, the method can include receiving one or more operational limits and rendering at least one of the operational limits with respect to the plot.

As an example, a method can include receiving data that include weight on bit (WOB) data. In such an example, the method can include partitioning operationally in a manner that includes partitioning the WOB data according to changes in weight versus time. In such an example, representing symbolically can include representing individual partitions of the partitioned WOB data with corresponding symbols that each represent a field operation of a plurality of field operations. In such an example, an operating procedure specification can include information as to at least one of the plurality of field operations.

As an example, a system can include one or more processors; a network interface operatively coupled to the one or more processors; memory operatively coupled to the one or more processors; and processor-executable instructions stored in the memory and executable by at least one of the processors to instruct the system to: acquire data associated with a field operation in a geologic environment; process the data by partitioning operationally and representing symbolically; formulate a symbolic query for an operating procedure specification; perform a search of the symbolically represented data utilizing the symbolic query and a probabilistic chain model; receive a search result responsive to the search; assess compliance with the operation procedure specification utilizing the search result; and issue a control signal to field equipment utilizing the assessment of compliance. In such an example, representing symbolically can include utilizing a symbolic aggregation approximation (SAX) scheme and/or the probabilistic chain model can be or include a hidden Markov model.

As an example, one or more computer-readable storage media can include computer-executable instructions executable to instruct a computing system to: acquire data associated with a field operation in a geologic environment; process the data by partitioning operationally and representing symbolically; formulate a symbolic query for an operating procedure specification; perform a search of the symbolically represented data utilizing the symbolic query and a probabilistic chain model; receive a search result responsive to the search; assess compliance with the operation procedure specification utilizing the search result; and issue a control signal to field equipment utilizing the assessment of compliance. In such an example, representing symbolically can include utilizing a symbolic aggregation approximation (SAX) scheme and/or the probabilistic chain model can be or include a hidden Markov model (HMM). As an example, a HMM can be a model of a standard operating procedure (SOP). As an example, a system can include a plurality of HMMs where each of the plurality of HMMs represents a corresponding operating procedure. As an example, a HMM may be utilized in determining whether an operating procedure has been complied with or not. As an example, a method can include training one or more HMMs. As an example, a system can include one or more trained HMMs.

Figure 24:
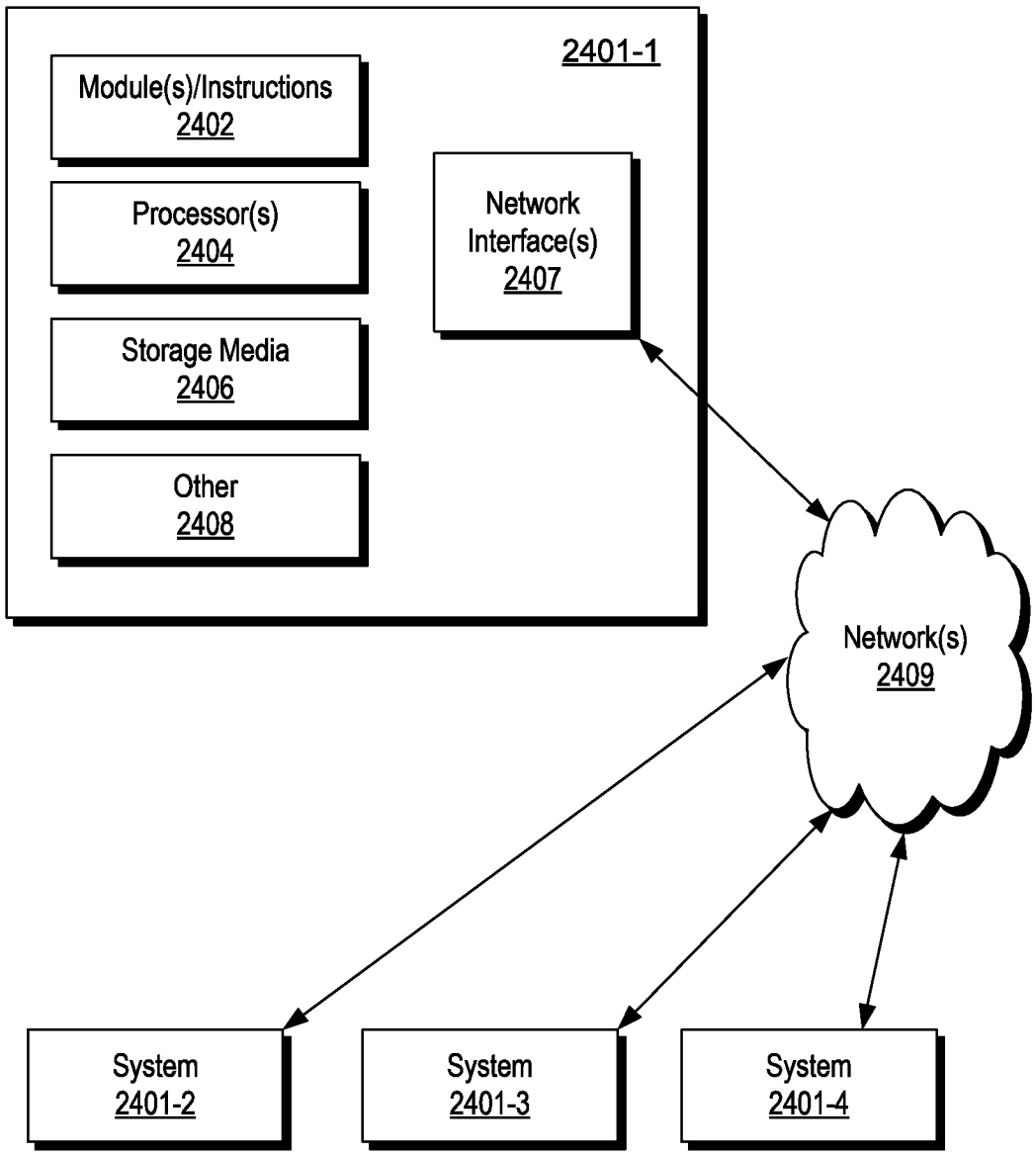
FIG. 24 illustrates examples of computing and networking equipment.

In some embodiments, a method or methods may be executed by a computing system. FIG. 24 shows an example of a system 2400 that can include one or more computing systems 2401-1, 2401-2, 2401-3 and 2401-4, which may be operatively coupled via one or more networks 2409, which may include wired and/or wireless networks.

As an example, a system can include an individual computer system or an arrangement of distributed computer systems. In the example of FIG. 24, the computer system 2401-1 can include one or more modules 2402, which may be or include processor-executable instructions, for example, executable to perform various tasks (e.g., receiving information, requesting information, processing information, simulation, outputting information, etc.).

As an example, a module may be executed independently, or in coordination with, one or more processors 2404, which is (or are) operatively coupled to one or more storage media 2406 (e.g., via wire, wirelessly, etc.). As an example, one or more of the one or more processors 2404 can be operatively coupled to at least one of one or more network interface 2407. In such an example, the computer system 2401-1 can transmit and/or receive information, for example, via the one or more networks 2409 (e.g., consider one or more of the Internet, a private network, a cellular network, a satellite network, etc.). As shown, one or more other components 2408 can be included.

As an example, the computer system 2401-1 may receive from and/or transmit information to one or more other devices, which may be or include, for example, one or more of the computer systems 2401-2, etc. A device may be located in a physical location that differs from that of the computer system 2401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 25:
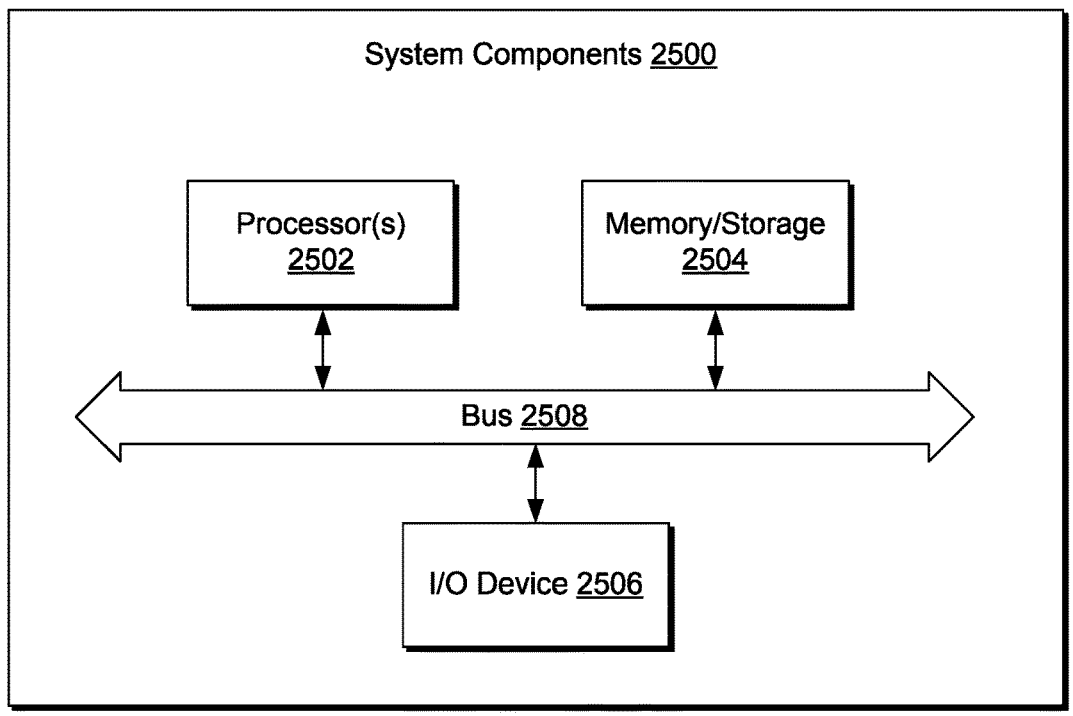
FIG. 25 illustrates example components of a system and a networked system.
Figure 25:
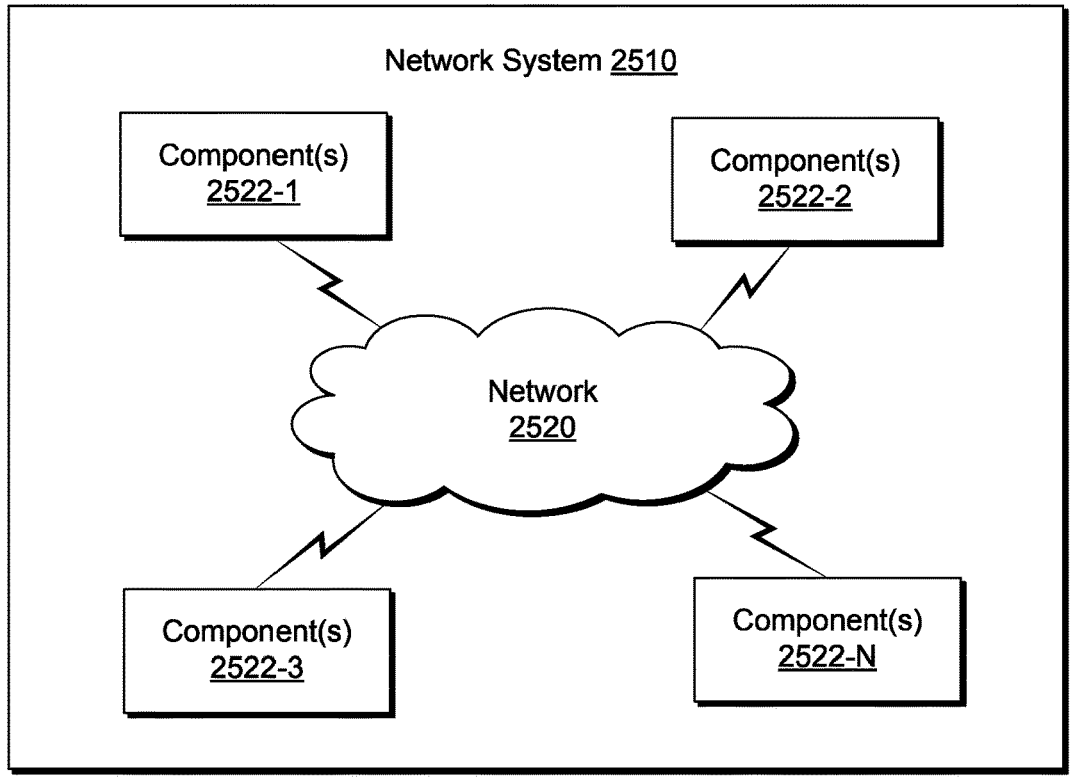

FIG. 25 shows components of a computing system 2500 and a networked system 2510. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510, which includes a network 2520. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    acquiring data associated with and during a field operation for directional drilling of a borehole in a geologic environment using a drillstring that comprises a drill bit;
    automatically processing the data by partitioning operationally and representing symbolically, wherein the partitioning isolates sections of the data based on likelihood of execution of different standard operating procedure specifications;
    automatically providing a symbolic query for one of the standard operating procedure specifications, wherein the symbolic query represents a staging action for the field operation;
    automatically performing a search of the symbolically represented data of one or more of the sections utilizing the symbolic query and a probabilistic chain model that represents the one of the standard operating procedure specifications;
    automatically receiving a search result responsive to the search;
    automatically assessing compliance of the staging action of the field operation with the one of the standard operating procedure specifications utilizing the search result; and
    responsive to the assessing indicating compliance of the staging action, automatically controlling movement of the drillstring for performance of one or more actions subsequent to the staging action for the directional drilling of the borehole in the geologic environment using the drillstring that comprises the drill bit.

2. The method of claim 1 wherein the representing symbolically comprises utilizing a symbolic aggregation approximation (SAX) scheme.

3. The method of claim 2 wherein the SAX scheme comprises letters as symbols.

4. The method of claim 1 comprising receiving one or more operational limits and formulating the symbolic query based at least in part thereon.

5. The method of claim 1 wherein performing the search comprises utilizing a hidden Markov model as the probabilistic chain model.

6. The method of claim 1 wherein members of the probabilistic chain model comprise corresponding symbolic representations.

7. The method of claim 1 wherein the data comprise time series data.

8. The method of claim 1 comprising rendering a graphical user interface to a display wherein the graphical user interface comprises a plot with respect to time.

9. The method of claim 8 comprising receiving one or more operational limits and rendering at least one of the operational limits with respect to the plot.

10. The method of claim 1 wherein the data comprise weight on bit (WOB) data, wherein the partitioning operationally comprises partitioning the WOB data according to changes in weight versus time.

11. The method of claim 10 wherein representing symbolically comprises representing individual partitions of the partitioned WOB data with corresponding symbols that each represent at least a portion of a field operation of a plurality of field operations.

12. The method of claim 1 wherein operationally partitioning comprises partitioning the data by a portion of the field operation, the field operation, or a combination of field operations.

13. The method of claim 1, wherein the partitioning isolates sections for going on bottom with the drill bit of the drillstring disposed in the borehole and wherein the one of the standard operating procedure specifications includes an operating procedure specification for going on bottom with the drill bit of the drillstring.

14. The method of claim 13, wherein the operating procedure specification for going on bottom calls for one or more staging actions to stage revolutions of the drill bit, flowrate of drilling fluid and weight on the drill bit, and wherein the data for the one or more sections comprise revolutions data for revolutions of the drill bit with respect to time, flowrate data for flowrate of the drilling fluid with respect to time and weight on the drill bit data for weight on the drill bit with respect to time.

15. The method of claim 1, wherein the partitioning utilizes a plurality of different base states for the field equipment.

16. The method of claim 15, wherein the base states comprise slips states, wherein the slips states comprise an in-slips state and an out-of-slips state.

17. The method of claim 1 wherein the staging action corresponds to a staging action to stage revolutions of the drill bit, to stage flowrate of drilling fluid, or to stage weight on the drill bit.

18. A system comprising:
one or more processors;
a network interface operatively coupled to the one or more processors;
memory operatively coupled to the one or more processors; and
processor-executable instructions stored in the memory and executable by at least one of the processors to instruct the system to:
acquire data associated with and during a field operation for directional drilling of a borehole in a geologic environment using a drillstring that comprises a drill bit;
automatically process the data by partitioning operationally and representing symbolically, wherein the partitioning isolates sections of the data based on likelihood of execution of different standard operating procedure specifications;
automatically provide a symbolic query for one of the standard operating procedure specifications, wherein the symbolic query represents a staging action for the field operation;
automatically perform a search of the symbolically represented data of one or more of the sections utilizing the symbolic query and a probabilistic chain model that represents the one of the standard operating procedure specifications;
automatically receive a search result responsive to the search;
automatically perform an assessment of compliance of the staging action of the field operation with the one of the standard operating procedure specifications utilizing the search result; and
responsive to the assessing indicating compliance of the staging action, automatically control movement of the drillstring for performance of one or more actions subsequent to the staging action for the directional drilling of the borehole in the geologic environment using the drillstring that comprises the drill bit.

19. One or more non-transitory computer-readable storage media comprising computer-executable instructions executable to instruct a computing system to:
acquire data associated with and during a field operation for directional drilling of a borehole in a geologic environment using a drillstring that comprises a drill bit;
automatically process the data by partitioning operationally and representing symbolically, wherein the partitioning isolates sections of the data based on likelihood of execution of different standard operating procedure specifications;
automatically provide a symbolic query for one of the standard operating procedure specifications, wherein the symbolic query represents a staging action for the field operation;
automatically perform a search of the symbolically represented data of one or more of the sections utilizing the symbolic query and a probabilistic chain model that represents the one of the standard operating procedure specifications;
automatically receive a search result responsive to the search;
automatically perform an assessment of compliance of the staging action of the field operation with the one of the standard operating procedure specifications utilizing the search result; and
responsive to the assessing indicating compliance of the staging action, automatically control movement of the drillstring for performance of one or more actions subsequent to the staging action for the directional drilling of the borehole in the geologic environment using the drillstring that comprises the drill bit.

\* \* \* \* \*